United States Patent
Leydon et al.

(10) Patent No.: US 9,690,767 B2
(45) Date of Patent: *Jun. 27, 2017

(54) SYSTEMS AND METHODS FOR IDENTIFYING AND SUGGESTING EMOTICONS

(71) Applicant: Machine Zone, Inc., Palo Alto, CA (US)

(72) Inventors: Gabriel Leydon, Redwood City, CA (US); Nikhil Bojja, Mountain View, CA (US)

(73) Assignee: Machine Zone, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/174,435

(22) Filed: Jun. 6, 2016

(65) Prior Publication Data

US 2016/0283454 A1 Sep. 29, 2016

Related U.S. Application Data

(63) Continuation of application No. 14/718,869, filed on May 21, 2015, now Pat. No. 9,372,608, which is a (Continued)

(51) Int. Cl.
   *G06F 17/24* (2006.01)
   *G06F 3/0484* (2013.01)
   (Continued)

(52) U.S. Cl.
   CPC .......... *G06F 17/24* (2013.01); *G06F 3/0219* (2013.01); *G06F 3/0238* (2013.01);
   (Continued)

(58) Field of Classification Search
   CPC .. G06F 3/04886; G06F 3/0237; G06F 17/274; H04L 51/04
   (Continued)

(56) References Cited

U.S. PATENT DOCUMENTS 5,805,911 A    9/1998  Miller
6,269,189 B1*  7/2001  Chanod ............ G06F 17/30985
                                                    382/229
(Continued)

FOREIGN PATENT DOCUMENTS

JP    2005-063245 A    3/2005
JP    2009-538462 A    11/2009
(Continued)

OTHER PUBLICATIONS

Da Silva Villaca, R., et al., "A Similarity Search System based on the Hamming Distance of Social Profiles," 2013 IEEE 7th International Conference on Semantic Computing, Sep. 16-18, 2013, pp. 90-93.

(Continued)

*Primary Examiner* — Michael N Opsasnick
(74) *Attorney, Agent, or Firm* — Goodwin Procter LLP

(57) ABSTRACT

Computer-implemented systems and methods are provided for suggesting emoticons for insertion into text based on an analysis of sentiment in the text. An example method includes: determining a first sentiment of text in a text field; selecting first text from the text field in proximity to a current position of an input cursor in the text field; identifying one or more candidate emoticons wherein each candidate emoticon is associated with a respective score indicating relevance to the first text and the first sentiment based on, at least, historical user selections of emoticons for insertion in proximity to respective second text having a respective second sentiment; providing one or more candidate emoticons having respective highest scores for user selection; and receiving user selection of one or more of the provided emoticons and inserting the selected emoticons into the text field at the current position of the input cursor.

26 Claims, 9 Drawing Sheets

Related U.S. Application Data continuation of application No. 14/324,733, filed on Jul. 7, 2014, now Pat. No. 9,043,196.

(51) Int. Cl.

| | | |
|---|---|---|
| *G07F 17/32* | (2006.01) | |
| *G06Q 30/02* | (2012.01) | |
| *G06F 17/27* | (2006.01) | |
| *G06F 3/02* | (2006.01) | |
| *G06F 3/023* | (2006.01) | |
| *H04L 12/58* | (2006.01) | |
| *H04W 4/18* | (2009.01) | |

(52) U.S. Cl.
CPC ........ *G06F 3/04842* (2013.01); *G06F 17/241* (2013.01); *G06F 17/27* (2013.01); *G06F 17/274* (2013.01); *G06F 17/2725* (2013.01); *G06F 17/2775* (2013.01); *G06F 17/2785* (2013.01); *G06Q 30/0209* (2013.01); *G07F 17/3244* (2013.01); *H04L 51/04* (2013.01); *H04W 4/18* (2013.01)

(58) Field of Classification Search
USPC ......................................................... 704/4, 5
See application file for complete search history.

(56) References Cited

U.S. PATENT DOCUMENTS

| | | |
|---|---|---|
| 6,990,452 B1 | 1/2006 | Ostermann et al. |
| 7,921,013 B1 | 4/2011 | Ostermann et al. |
| 8,019,818 B2 | 9/2011 | Lorch et al. |
| 8,065,601 B2 | 11/2011 | Anderson et al. |
| 8,299,943 B2 | 10/2012 | Longe |
| 8,547,354 B2 | 10/2013 | Koch et al. |
| 8,549,391 B2 | 10/2013 | Anderson et al. |
| 8,909,513 B2 | 12/2014 | Leydon |
| 9,043,196 B1 | 5/2015 | Leydon et al. |
| 9,075,794 B2 | 7/2015 | Leydon |
| 9,244,907 B2 | 1/2016 | Leydon |
| 9,372,608 B2 | 6/2016 | Leydon et al. |
| 2005/0192802 A1 | 9/2005 | Robinson et al. |
| 2005/0234722 A1 | 10/2005 | Robinson et al. |
| 2006/0015812 A1* | 1/2006 | Cunningham ........ G06F 3/0219 715/263 |
| 2006/0241933 A1 | 10/2006 | Franz |
| 2007/0276814 A1 | 11/2007 | Williams |
| 2008/0082678 A1 | 4/2008 | Lorch et al. |
| 2008/0216022 A1 | 9/2008 | Lorch et al. |
| 2009/0234784 A1 | 9/2009 | Buriano et al. |
| 2010/0057743 A1* | 3/2010 | Pierce ............... G06F 17/30699 707/E17.134 |
| 2010/0131447 A1 | 5/2010 | Creutz et al. |
| 2010/0179991 A1* | 7/2010 | Lorch ................ H04M 1/7253 709/206 |
| 2010/0240350 A1 | 9/2010 | Ilkanaev et al. |
| 2012/0078636 A1 | 3/2012 | Ferrucci et al. |
| 2013/0159919 A1 | 6/2013 | Leydon |
| 2013/0247078 A1* | 9/2013 | Nikankin ......... H04N 21/44204 725/13 |
| 2014/0214409 A1 | 7/2014 | Leydon |
| 2014/0303964 A1 | 10/2014 | Kennard et al. |
| 2015/0100537 A1 | 4/2015 | Grieves et al. |
| 2015/0220774 A1 | 8/2015 | Ebersman et al. |

FOREIGN PATENT DOCUMENTS

| | | |
|---|---|---|
| JP | 2011-138343 A | 7/2011 |
| JP | 2011-171891 A | 9/2011 |
| WO | WO-2007/080570 A1 | 7/2007 |
| WO | WO-2009/128838 A1 | 10/2009 |
| WO | WO-2015/087084 A1 | 6/2015 |

OTHER PUBLICATIONS

European Search Report of the EPO in EP2795441A2; Sep. 7, 2015; 7pgs.

Int'l Search Report and Written Opinion of the ISA/US in PCT/US2014/045580; Nov. 24, 2014; 11pgs.

Int'l Search Report and Written Opinion of the ISA/US in PCT/US2012/070677; Apr. 8, 2013; 7pgs.

Mihalcea, R. and Banea, C., "Learning Multilingual Subjective Language via Cross-Lingual Projections," Proc. of the 45th Annual Meeting of the Assoc. of Computational Linguistics; Jun. 25, 2007, pp. 976-983.

Taboada, et al., "Lexicon-Based Methods for Sentiment Analysis," Computational Linguistics; 25(3):286-307; Jun. 1, 2011.

U.S. Appl. No. 13/330,357, filed Dec. 19, 2011, Systems and Methods for Identifying and Suggesting Emoticons, Leydon.

U.S. Appl. No. 14/976,925, filed Dec. 21, 2015, Systems and Methods for Identifying and Suggesting Emoticons, Leydon.

U.S. Appl. No. 14/718,869, filed May 21, 2015, Systems and Methods for Identifying and Suggesting Emoticons, Leydon, et al.

U.S. Appl. No. 15/384,950, filed Dec. 20, 2016, Systems and Methods for Suggesting Emoji.

Written Opinion of the Austrian Patent Office in Singapore App. No. 11201403373X dated Jun. 18, 2015; 12pgs.

Written Opinion of the Austrian Patent Office in Singapore App. No. 11201403373X dated Jun. 16, 2016; 6pgs.

Official Action and Search Report (Translated) in Japanese Patent Application No. 2014-548845; dated Sep. 20, 2016; 4pgs.

Cappallo et al., "Image2Emoji," Multimedia, ACM, New York, NY; Oct. 2015; pp. 1311-1314.

Dzeroski et al., "Is Combining Classifiers with Stacking Better than Selecting the Best One?" Machine Learning, Kluwer Academic Publishers-Plenum Publishers, NE., vol. 54, No. 3; Mar. 2004; pp. 255-273.

Int'l Search Report and Written Opinion of the ISA/EP in PCT/US2016/067723; Mar. 23, 2017; 15 pgs.

Lee et al.; "Intelligent data entry assistant for XML using ensemble learning," 2005 Int'l Conference on Intelligent User Interfaces, IUI 05, San Diego, CA; Jan. 9-12, 2005; p. 83.

\* cited by examiner

SYSTEMS AND METHODS FOR IDENTIFYING AND SUGGESTING EMOTICONS

CROSS REFERENCE TO RELATED APPLICATIONS

This application is a continuation of and claims priority from U.S. patent application Ser. No. 14/718,869, filed May 21, 2015 (now U.S. Pat. No. 9,372,608), entitled "Systems and Methods for Identifying and Suggesting Emoticons," which is a continuation of and claims priority from U.S. patent application Ser. No. 14/324,733, filed Jul. 7, 2014 (now U.S. Pat. No. 9,043,196), entitled "Systems and Methods for Identifying and Suggesting Emoticons." The preceding patent applications are hereby incorporated by reference in their entirety.

FIELD OF THE INVENTION

The invention(s) described herein generally relate to emoticons. More particularly, the invention(s) relate to systems and methods for identifying and suggesting emoticons during various activities on a computing device.

BACKGROUND OF THE INVENTION

Originally, emoticons were facial expressions represented by characters (e.g., ASCII characters) commonly found on computer keyboards, such as letters, numbers, and symbols. These original emoticons, once placed in an electronic message or an electronic posting by an author (e.g., electronic bulletin board), were meant to convey the author's mood or to convey/enhance the overall sentiment of the message or the posting. In beginning, these emoticons were limited to expressing moods, such as happiness, anger, sadness, and indifference. Gradually, however, the use of these character-based emoticons characters (hereafter, "character emoticons") expanded to conveying meanings and messages.

Eventually, emoticons expanded further in type, availability, and usage. Today, emoticons include character emoticons and emoticons represented by graphical images (hereafter, "graphical emoticons"). With the availability of graphical emoticons, a user can depict a greater number of moods, meanings and messages not once possible with character emoticons alone. Both character and graphical emoticons are now available for use through a variety of digital devices (e.g., mobile telecommunication devices, and tablets), and are used in a variety of computing activities, especially with respect to the Internet. For example, graphical emoticons are commonly available for use when drafting personal e-mails, when posting messages on the Internet (e.g., on social networking site or a web forum), and when messaging between mobile devices. Generally, as a user performs a computing activity applicable to emoticons, the user may access emoticons through a menu or library from which they can browse and select emoticons for use in the computing activity.

Unfortunately, with the emergence of graphical emoticons, the number of emoticons a user can choose from has grown vastly. There are graphical emoticons available for almost every subject matter imaginable. Due to the expansion in number, usage, availability, and variety of emoticons, it can be quite time consuming, and sometimes overwhelming, for users to browse through and select appropriate emoticons for a given context when participating in emoticon-applicable computing activities.

SUMMARY OF THE INVENTION

Various embodiments discussed herein provide systems and methods for identifying and suggesting emoticons for segments of texts. Some systems and methods may be utilized during a user activity on a computing device including, without limitation, instant messaging, participating in online chat rooms, drafting e-mails, posting web blogs, or posting to web forums.

An exemplary method includes receiving a set of segments from a text field, analyzing the set of segments to determine at least one of a target subtext or a target meaning associated with the set of segments, and identifying a set of candidate emoticons where each candidate emoticon in the set of candidate emoticons has an association between the candidate emoticon and at least one of the target subtext or the target meaning. The method may further include presenting the set of candidate emoticons for entry selection at a current position of an input cursor, receiving an entry selection for a set of selected emoticons from the set of candidate emoticons, and inserting the set of selected emoticons into the text field at the current position of the input cursor. The set of segments may include one or more segments of interest selected relative to a current position of an input cursor in the text field, the set of candidate emoticons may include one or more candidate emoticons, and the set of selected emoticons may include one or more selected emoticons. Depending on the embodiment, analyzing the set of segments may include semantic analysis of the set of segments.

For some embodiments, each association may include a statistical usage of the candidate emoticon with at least one of the target subtext or the target meaning. Additionally, for some embodiments, the method may further include updating the statistical usage of the candidate emoticons based on the entry selection for the set of selected emoticons. Depending on the embodiment, the statistical usage may be based on usage by a single user or by a plurality of users.

Presenting the set of emoticons for entry selection may involve displaying the emoticon, for entry selection, at or near the current position of the input cursor. Presenting the set of candidate emoticons for entry selection may include displaying the set of candidate emoticons, for entry selection, on a physical input device or a virtual input device (e.g., on-screen keyboard, or a projected keyboard), wherein the physical input device and the displayed input interface are configured to execute the entry selection. Depending on the embodiment, the virtual input device may be displayed by a display device that is also displaying the text field. Additionally, the virtual input device may be displayed in close proximity to the text field.

In some embodiments, the method may further include identifying the set of segments using syntactical analysis. Each segment of interest may include at least one of a word, a sentence fragment, a sentence, a phrase, or a passage that precedes or follows a current position of an input cursor.

In particular embodiments, identifying the set of candidate emoticons may be further based on at least a user preference, user-related information, or recipient-related information. The user-related information may include a user interest, a user ethnicity, a user religion, a user geographic location, a user age, a user relational status, and a user occupation. The recipient-related information may include a recipient's relation to a user, a recipient interest, a recipient ethnicity, a recipient religion, a recipient geographic location, a recipient age, a recipient relational status, and a recipient occupation.

An exemplary system includes a processor, a display module, an input module, a segment analysis module, an emoticon search module, an emoticon suggestion module, and an emoticon selection module. The display module may be configured to display a text field and one or more segments entered into the text field.

The input module may be configured to receive segment input from a user and to enter the segment input into the text field at an input cursor. The segment analysis module may be configured to receive a set of segments from the text field, wherein the set of segments includes one or more segments of interest selected relative to a current position of the input cursor in the text field. The segment analysis module may be further configured to use the processor to analyze the set of segments to determine at least one of a target subtext or a target meaning associated with the set of segments. The emoticon search module may be configured to identify a set of candidate emoticons, wherein each candidate emoticon in the set of candidate emoticons has an association between the candidate emoticon and at least one of the target subtext or the target meaning, and wherein the set of candidate emoticons includes one or more candidate emoticons. The emoticon suggestion module may be configured to present the set of candidate emoticons through the display module for entry selection at the current position of the input cursor. The emoticon selection module may be configured to receive from the input module an entry selection for a set of selected emoticons from the set of candidate emoticons, wherein the set of selected emoticons includes one or more selected emoticons. The emoticon selection module may be further configured to insert the set of selected emoticons into the text field at the current position of the input cursor.

In some embodiments, the system further includes an emoticon datastore having one or more emoticons capable of entry into the text field, and wherein the emoticon search module is further configured to identify a set of candidate emoticons on the emoticon datastore.

In various embodiments, each association may include a statistical usage of the candidate emoticon with at least one of the target subtext or the target meaning, and the emoticon selection module may be further configured to update the statistical usage of the candidate emoticons based on the entry selection for the set of selected emoticons.

In some embodiments, presenting the set of emoticons through the display module for entry selection may include displaying the emoticon, for entry selection, at or near the current position of the input cursor. The input module may include a physical input device or a virtual input device, wherein the physical input device and the virtual input interface are configured to execute the entry selection.

In one aspect, the invention relates to a computer-implemented method. The method includes: determining a first sentiment of text in a text field; selecting first text from the text field in proximity to a current position of an input cursor in the text field; identifying one or more candidate emoticons wherein each candidate emoticon is associated with a respective score indicating relevance to the first text and the first sentiment based on, at least, historical user selections of emoticons for insertion in proximity to respective second text having a respective second sentiment; providing one or more candidate emoticons having respective highest scores for user selection; and receiving user selection of one or more of the provided emoticons and inserting the selected emoticons into the text field at the current position of the input cursor.

In certain examples, the method includes receiving one or more user-defined emoticons provided by a user, each user-defined emoticon including a visual representation of the emoticon and being associated with a respective natural language and respective text. The method may also include crediting an account of the user for creation of the user-defined emoticons. The credit may be, for example, a virtual asset for an electronic game. Statistics may be provided to the user pertaining to use of the user-defined emoticons by other users.

In some implementations, one of the candidate emoticons is one of the user-defined emoticons, which may have an associated score that is higher than the scores of the other candidate emoticons. Providing the candidate emoticons for user selection may include ordering the candidate emoticons according to the respective scores and providing the candidate emoticons according to the order.

The method may also include determining that the first text is text associated with a brand, a product, and/or a service and, based thereon, identifying a candidate emoticon for the brand, the product, and/or the service. The associated score of the candidate emoticon for the brand, the product, or the service may be higher than the associated scores of the other candidate emoticons. In some examples, the method includes calculating the score of a particular candidate emoticon based on a distance between the first and second texts, a historical number of user selections of the particular emoticon, and similarity between the first and second sentiment. The score may be based on similarity between a natural language of the first text and a natural language of the second text.

In some implementations, providing the candidate emoticons includes presenting the candidate emoticons for user selection at or near the current position of the input cursor. The first text may include, for example, at least one of a word, a sentence fragment, a sentence, a phrase, or a passage that precedes or follows the current position of the input cursor. In one example, identifying the candidate emoticons is further based on at least a preference of the user, user-related information, and/or recipient-related information. The method may include providing an application programming interface through which the identifying of the candidate emoticons can be initiated.

In another aspect, a system includes a searchable corpus of emoticons and one or more computers programmed to provide an application programming interface. The application programming interface is configured to perform operations including: determining a first sentiment of text in a text field; selecting first text from the text field in proximity to a current position of an input cursor in the text field, wherein the selected text includes one or more segments; identifying one or more candidate emoticons in the corpus wherein each candidate emoticon is associated with a respective score indicating relevance to the first text and the first sentiment based on, at least, historical user selections of emoticons for insertion in proximity to respective second text having a respective second sentiment; providing one or more of candidate emoticons having respective highest scores for user selection; and receiving user selection of one or more of the provided emoticons and inserting the selected emoticons into the text field at the current position of the input cursor.

In some examples, the corpus of emoticons includes public emoticons and private emoticons. The operations may also include receiving one or more user-defined emoticons provided by a user, each user-defined emoticon including a visual representation of the emoticon and being associated with a respective natural language and respective text. In one implementation, the operations include crediting an account of the user for creation of the user-defined emoticons. The credit may be, for example, a virtual asset or virtual currency for an electronic game. The user may be provided with statistics pertaining to use of the user-defined emoticons by other users.

In various implementations, providing the candidate emoticons for user selection includes ordering the candidate emoticons according to the respective scores and providing the candidate emoticons according to the order. The operations may also include determining that the first text is text associated with a brand, a product, and/or a service and, based thereon, identifying a candidate emoticon for the brand, the product, and/or the service. In one example, the operations also include calculating the score of a particular candidate emoticon based on a distance between the first and second texts, a historical number of user selections of the particular emoticon, and similarity between the first and second sentiment. The score may be based on similarity between a natural language of the first text and a natural language of the second text.

In certain examples, providing the candidate emoticons includes presenting the candidate emoticons for user selection at or near the current position of the input cursor. The first text may include at least one of a word, a sentence fragment, a sentence, a phrase, or a passage that precedes or follows the current position of the input cursor. Identifying the candidate emoticons may be based on at least a preference of the user, user-related information, and/or recipient-related information. The operations may also include providing an application programming interface through which the identifying of the candidate emoticons can be initiated.

In another aspect, the invention relates to a computer program product stored in one or more storage media for controlling a processing mode of a data processing apparatus. The computer program product is executable by the data processing apparatus to cause the data processing apparatus to perform operations including: determining a first sentiment of text in a text field; selecting first text from the text field in proximity to a current position of an input cursor in the text field; identifying one or more candidate emoticons wherein each candidate emoticon is associated with a respective score indicating relevance to the first text and the first sentiment based on, at least, historical user selections of emoticons for insertion in proximity to respective second text having a respective second sentiment; providing one or more candidate emoticons having respective highest scores for user selection; and receiving user selection of one or more of the provided emoticons and inserting the selected emoticons into the text field at the current position of the input cursor.

Other features and aspects of some embodiments will become apparent from the following detailed description, taken in conjunction with the accompanying drawings, which illustrate, by way of example, the features in accordance with various embodiments.

BRIEF DESCRIPTION OF THE DRAWINGS

Various embodiments are described in detail with reference to the following figures. The drawings are provided for purposes of illustration only and merely depict some example embodiments. These drawings are provided to facilitate the reader's understanding of the various embodiments and shall not be considered limiting of the breadth, scope, or applicability of embodiments.

DETAILED DESCRIPTION

A number of embodiments described herein relate to systems and methods that identify and suggest emoticons during a variety of activities on a computing device involving typing characters into a text field. Various systems and methods may identify the emoticon by analyzing a context of segments present in the text field and identifying one or more candidate emoticons available for entry into the text field based on that context. Subsequently, the user may select one or more emoticons from the candidate emoticons and the selected emoticons may be entered into the text field. Optionally, the user could choose to ignore the emoticon suggestion(s) entirely, and continue with their activities on the computing device. As used in this description, a "segment" may comprise one or more characters that represent a word, a phrase, a sentence fragment, a sentence, or a passage.

Depending on the embodiment, analysis of the context of segments present in the text field may involve determining a subtext or a meaning relating to those segments, which may require semantic analysis of those segments. Also, as described herein, the association between a particular candidate emoticon and a particular subtext or meaning may be based on (past) statistical usage of the particular candidate emoticon with the particular subtext or meaning. In various embodiments, such emoticon usage may be based on a user's personal usage of the particular emoticon with the particular subtext or meaning (e.g., user's selection of suggested emoticons in the particular subtext or meaning), or may be based on a community's usage of the particular emoticon with the particular subtext or meaning (e.g., observed usage of certain emoticons in postings on a social network by a community of users).

Figure 1:
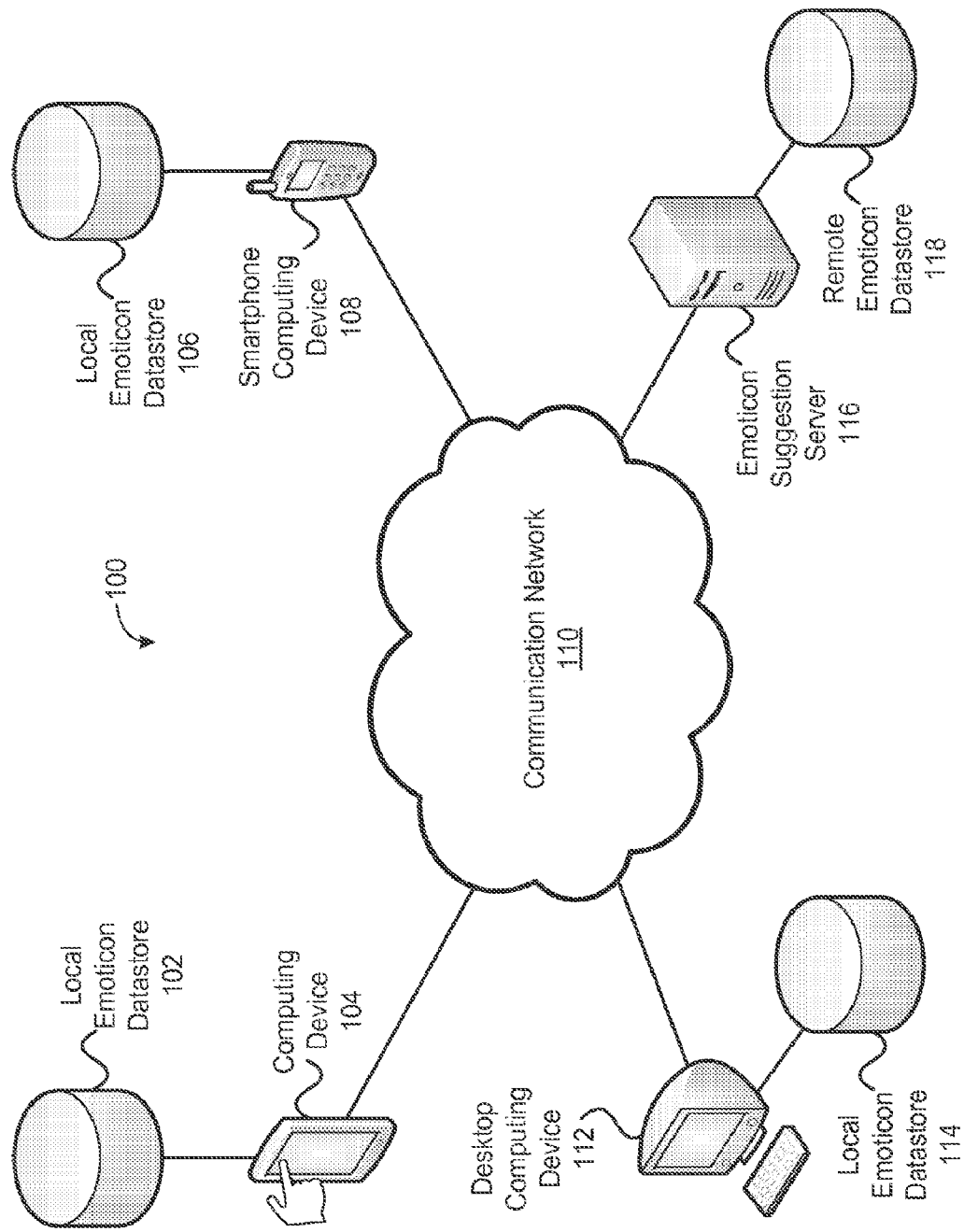
FIG. 1 depicts an example of an environment in which various embodiments may be utilized.

FIG. 1 depicts an example of an environment 100 in which various embodiments may be utilized. The environment 100 comprises a tablet computing device 104, a local emoticon datastore 102 coupled to the tablet computing device 104, a smartphone computing device 108, a local emoticon datastore 106 coupled to the smartphone computing device 108, a desktop computing device 112, a local emoticon datastore 114 coupled to the desktop computing device 112, an emoticon suggestion server 116, and a local emoticon datastore 118 coupled to the emoticon suggestion server 116. The environment 100 further comprises a communication network 110 over which the tablet computing device 104, the smartphone computing device 108, the desktop computing device 112, and the emoticon suggestion server 116 communicate. The tablet computing device 104, the smartphone computing device 108, the desktop computing device 112, and the emoticon suggestion server 116 are examples of digital devices having a processor and memory. Other exemplary digital devices with which various embodiments may be utilized include laptops, netbooks, notebooks, media devices, music devices personal digital assistants (PDAs), or the like. Exemplary digital devices are further described in FIG. 7.

In accordance with some embodiments, the tablet computing device 104, the smartphone computing device 108, and the desktop computing device 112 may be exemplary digital devices that utilize systems and methods for identifying and suggesting emoticons for entry. For instance, such computing devices may utilize certain embodiments to identify and suggest emoticons when a user is using an instant messaging application on such computing devices, or when the user is posting a message on a website forum through such computing devices. Those of ordinary skill in the art will appreciate that other digital devices could be utilized in conjunction with various embodiments described herein.

In some embodiments, the emoticon suggestion server 116 may facilitate the identification and suggestion of an emoticon for a user at a digital device. As later described herein, the emoticon suggestion server 116 may determine the context of a segment, may identify one or more candidate emoticons based on a determined context, may suggest one or more candidate emoticons to a digital device, or may perform some combination thereof. For various embodiments, the emoticon suggestion server 116 may be a service operating on a server that hosts an Internet service, where the emoticon suggestion server 116 provides emoticon suggestion functionality to the Internet service. For instance, the emoticon suggestion server 116 may be a service operating on a web server that is hosting a website (e.g., a website forum or a social networking website) that is being serviced by the emoticon suggestion server 116 (i.e., that is being provided emoticon suggestions by the emoticon suggestion server 116).

Depending on the embodiment, various operations and components for identifying and suggesting an emoticon may be isolated to the digital device that utilizes the emoticon suggestions, or may be distributed on varying levels amongst two or more digital devices. For example, a system or method for identifying, suggesting, and entering an emoticon when drafting an e-mail on the smartphone computing device 108 may be entirely embedded in an e-mail application that is stored and operated on the smartphone computing device 108. In an alternative example, while using the tablet computing device 104 to prepare a message post for a website forum, a system or method for identifying, suggesting, and entering an emoticon may utilize the tablet computing device 104 to determine the context of the message as currently prepared, utilize the emoticon suggestion server 116 to identify one or more candidate emoticons for use in the message as currently prepared, and then utilize the tablet computing device 104 to present the candidate emoticons as suggested emoticons.

The emoticon suggestion server 116 may utilize the remote emoticon datastore 118 during the identification and suggestion of emoticons to digital devices. For certain embodiments, the remote emoticon datastore 118 may comprise a library of emoticons available for suggestion by the emoticon suggestion server 116, and associations between emoticons in the library and contexts (e.g., subtexts and meanings). For example, the remote emoticon datastore 118 may comprise a library of "happy face" emoticons, and associations between the "happy face" emoticons and a happy context. In another example, the remote emoticon datastore 118 may comprise a library of "San Francisco" emoticons, and associations between the "San Francisco" emoticons and contexts that explicitly or implicitly refers to the city of San Francisco. For some embodiments, the remote emoticon datastore 118 may comprise two or more associations between a given emoticon and a given context (e.g., subtext or meaning). For example, the remote emoticon datastore 118 may comprise a library of "frowning face" emoticons, associations between the "frowning face" emoticons and a sad context, and associations between the "frowning face" emoticons and a displeased context. Those skilled in the art would appreciate that a variety of emoticon libraries and a variety of association between emoticons and contexts can be stored on the remote emoticon datastore 118.

Depending on the embodiment, the library of emoticons may comprise emoticons that are accessible by any user or accessible by a limited group of users restricted access (e.g., based on a premium, or only accessible to certain groups), user-customized or user-uploaded emoticons, or emoticons that are user favorites. In addition to character and graphical emoticons that convey a mood or emotion from an author, emoticons used in various embodiments may include those that relate to interests, hobbies, geographic locations, events, holidays, seasons, weather, and the like. Emoticons stored on the emoticon suggestion datastore 118 may include character emoticons, graphical emoticons, graphically animated emoticons, and emoticons accompanied by sound. For some embodiments, the remote emoticon datastore 118 may further comprise user preferences, user information or recipient information, which may be utilized by the embodiments when identifying emoticons suitable for suggestion. For example, the remote emoticon datastore 118 may store a user preference that causes an embodiment to suggest user-defined or user-uploaded emoticons before suggesting emoticons generally available to any user. In another example, the remote emoticon datastore 118 may store a user preference that causes an embodiment to automatically insert the first emoticon suggested to the user by the embodiment, or to automatically insert the suggested emoticon having the highest usage in a given context.

In some embodiments, the tablet computing device 104, the smartphone computing device 108, and the desktop computing device 112 may each be coupled to a separate, local emoticon datastore capable of storing user-customized emoticons, a user's favorite or preferred emoticons, associations between emoticons stored on the local emoticon datastore and contexts (e.g., subtext or meaning), user preferences with respect to identifying and suggesting emoticons, user-related information, or recipient-related information. For instance, the tablet computing device 104 may be coupled to the local emoticon datastore 102, the smartphone computing device 108 may be coupled to the local emoticon datastore 106, and the desktop computing device 112 may be coupled to the local emoticon datastore 114.

Additionally, each of the local emoticon datastores 102, 106, and 114 may be utilized by their respective computing device to locally cache previously suggested emoticons or suggested emoticons previously selected by a user. In doing so, some embodiments can repeatedly suggest the same emoticons for a commonly occurring contexts while limiting the number of times the emoticon suggestions server 116 is queried for the suggested emoticons. For some embodiments, the emoticons cached in the local emoticon datastores 102, 106, and 114 may have an expiration time, after which the cached emoticons are invalidated or purged. Once an emoticon item in the cache has expired, some embodiments resume querying the emoticon suggestion server 116 for suggested emoticons.

Figure 2:
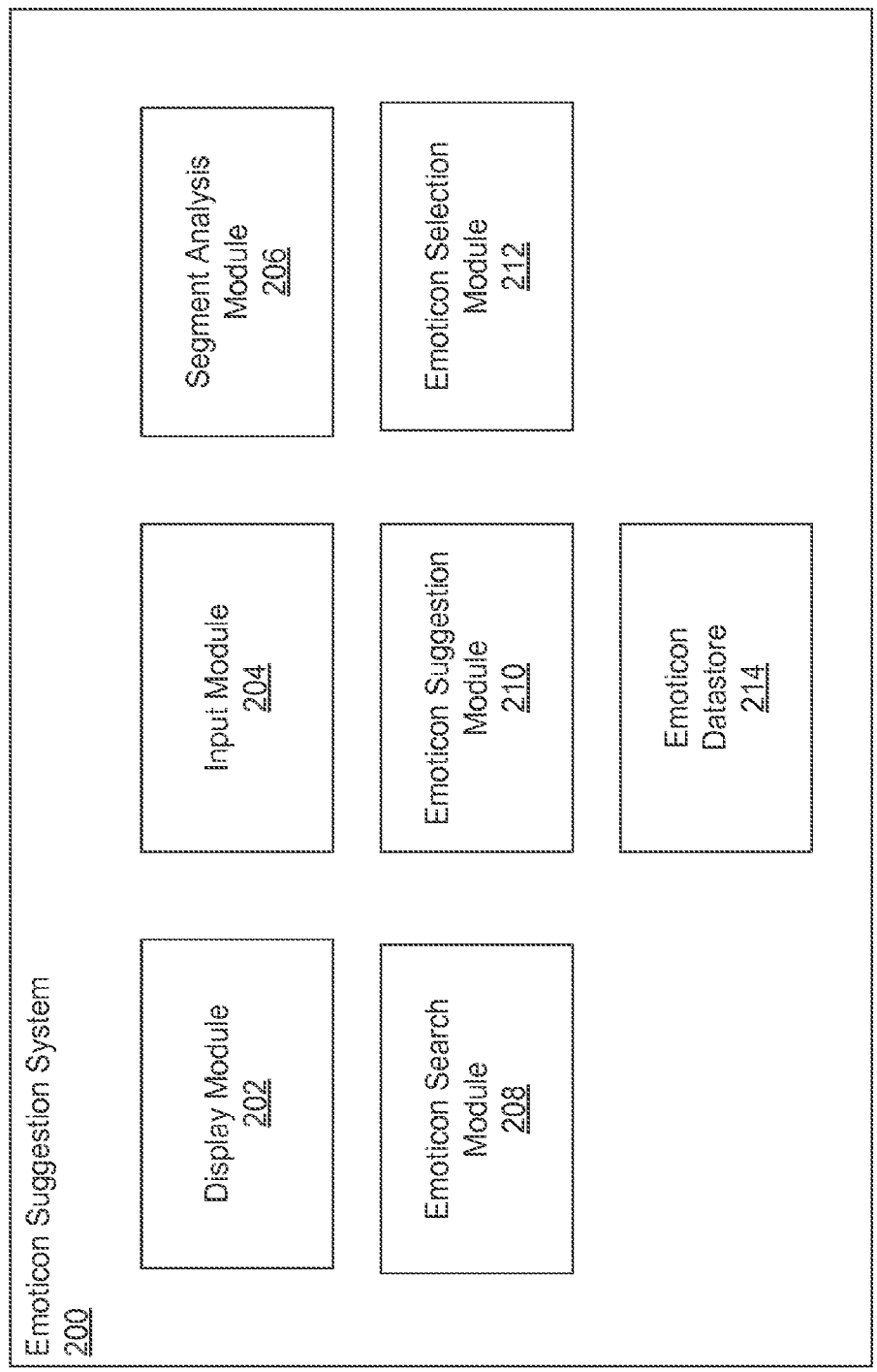
FIG. 2 is a block diagram of an exemplary emoticon suggestion system in accordance with some embodiments.

FIG. 2 is a block diagram of an exemplary emoticon suggestion system 200 in accordance with some embodiments. The emoticon suggestion system 200 may comprise a display module 202, an input module 204, a segment analysis module 206, an emoticon search module 208, an emoticon suggestion module 210, an emoticon selection module 212, and an emoticon datastore 214. In some embodiments, the emoticon suggestion system 200 may further comprise memory and at least one processor, which facilitate operation of various modules contained in the emoticon suggestion system 200.

The display module 202 may display an input field, such as a text field or a text box, into which a user can input one or more segments, character emoticons, or graphical emoticons using the input module 204. Typically, as segments and emoticons are entered into the input field they appear in the input field. As noted herein, a "segment" may comprise one or more characters that represent a word, a phrase, a sentence fragment, a sentence, or a passage. As part of the input field, the display module 202 may display an input cursor, which indicates where a user's character inputs will be next entered or where an emoticon may be next entered.

As noted herein, various embodiments may suggest emoticons based on the current position of the input cursor within the input field, the present segment content of the input, user-related information, recipient-related information, user preferences, or some combination thereof. Generally, once one or more candidate emoticons have been identified for suggestion to the user (e.g., based on the segment content of the input field), the candidate emoticons may be suggested to the user via the display module 202. Specifically, the display module 202 may, for the user's selection, display the candidate emoticons at or near the current position of the input cursor in the input field. Depending on the embodiment, the display module 202 may display the candidate emoticons at or near the input field via a callout box.

For some embodiments, the display module 202 may form part of a digital device (e.g., video display, or video projector) that may be responsible for displaying all graphical output from the digital device. In some embodiments, the display module 202 may display the input field as part of a graphical user interface (GUI). For instance, the input field may be a graphical component of an application operating on a digital device (e.g., e-mail client, or an instant messaging application), or may be a graphical representation of a document viewable or editable through an application operating on the digital device (e.g., a text field of a web page shown through a web browser, or a document shown through a word processor). Those of ordinary skill in the art will appreciate that the input field may vary in type and size from embodiment to embodiment.

The input module 204 may receive character input from a user and enter such character input into the input field as received. As character input is entered into the input field, the display module 202 may update the input field with the character input. Additionally, the input module 204 may further receive entry selections for emoticons suggested, in accordance with various embodiments. Generally, upon selection, the selected emoticons may be inserted at the current position of the input cursor in the input field. Depending on the embodiment, the input module may comprise a physical input device that is externally coupled to a digital device or that is physically embedded into the digital device. Examples of physical input devices can include, without limitation, keyboards, trackpads or computer mice. In some embodiments, the input module may comprise a virtual input device, such as a laser-projected keyboard or an on-screen keyboard, which may be provided (i.e., displayed) to the user through the display module 202. In various embodiments, as virtual input devices are employed, such virtual input devices may be displayed at or near the input field to which segments will be inputted.

Figure 6:
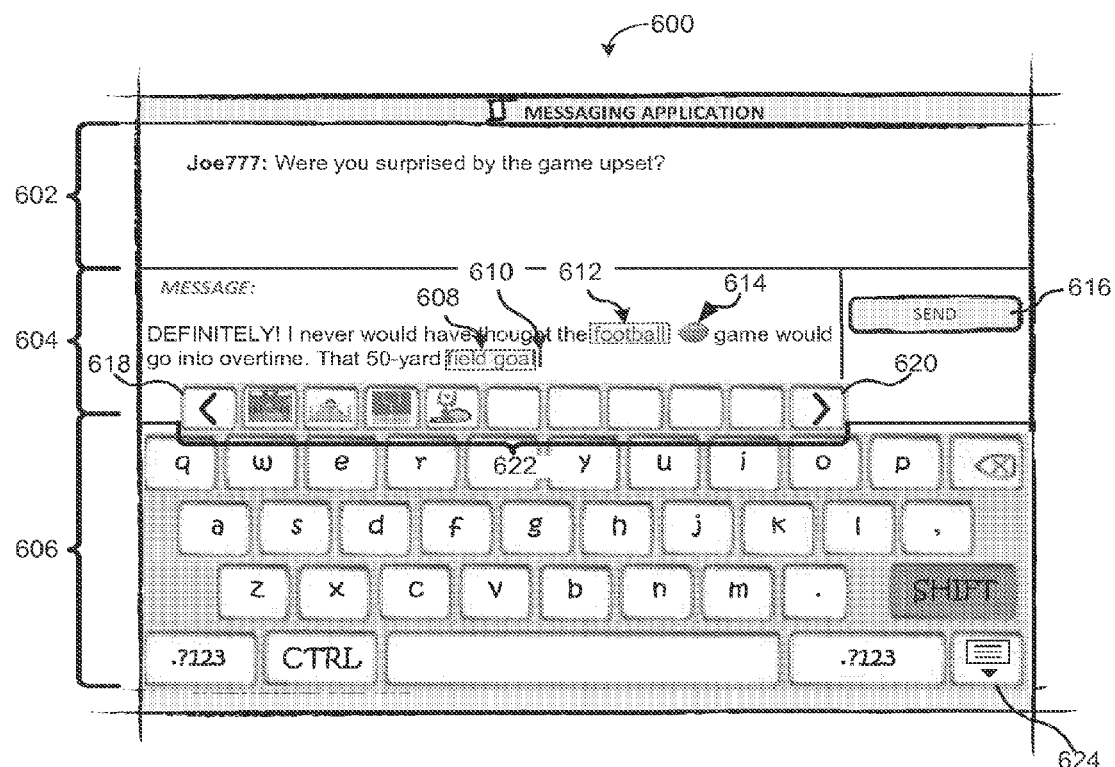
FIG. 6 depicts a user-interface of a messaging application, where the messaging application utilizes an embodiment.

As further described in FIG. 6, in some embodiments, suggested emoticons may be presented to the user through the input module 204. For example, where input module 204 comprises a physical keyboard, the physical keyboard may be configured to display suggested emoticons through the physical keyboard. For some embodiments, the physical keyboard may display suggested emoticons by way of keys or buttons that comprise embedded displays (e.g., LCD buttons), or by way of a display embedded on a surface of the physical keyboard (e.g., at the top of the keyboard). Depending on the embodiment, the suggested emoticons may be displayed through the physical keyboard in color or in grayscale. As the suggested emoticons are displayed through the physical keyboard, the user may select one or more of those suggested emoticons through keys or buttons of the physical keyboard.

In another example, where the input module 204 comprises an on-screen keyboard (like those found on some tablet computing devices and smartphone computing devices), the appearance of the on-screen keyboard may be reconfigured to display the suggested emoticons through the on-screen keyboard. For some embodiments, the appearance of the on-screen keyboard may be reconfigured so that certain buttons of the on-screen keyboard are replaced with suggested emoticons buttons, or so that the on-screen keyboard is augmented with additional suggested emoticon buttons. Once presented to through the on-screen keyboard, the suggested emoticon buttons may be used by a user to select from the one or more suggested emoticons.

The segment analysis module 206 may analyze one or more segments present in the input field and determine a context for the segments analyzed. As described herein, the context determined by the segment analysis module 206 may be subsequently utilized when identifying candidate emoticons to be suggested to the user. In various embodiments, the segment analysis module 206 may analyze only segments of interest from the input field when determining the context of segments in the input field.

In some embodiments, the segment analysis module 206 first identifies segments of interest in the input field, and then analyzes those segments of interest to determine a context. Generally, the segments of interest are identified in relation to a current position of an input cursor in the input field. Additionally for some embodiments, the segment analysis module 206 may perform syntactical analysis of the segments currently present in the input field when identifying segments of interest.

Depending on the embodiment, the segment analysis module 206 may identify the segments of interest based on conditional or non-conditional rules that guide the segment of interest identification process. An exemplary rule for identifying segments of interest may include identifying the sentence fragment or sentence immediately preceding the current position of the input cursor in the input field as a segment of interest. Another exemplary rule for identifying segments of interest may include identifying the sentence fragment or sentence immediately following the current position of the input cursor in the input field as a segment of interest. For some embodiments, the rules may be utilized in conjunction with the syntactical analysis performed by the segment analysis module 206 to determine the segments of interest.

Where more than one segment of interest is identified, the segment analysis module 206 may analyze the context of each of the segments of interest, or may analyze the context of all but the least important segments of interest (e.g., based on a weight system, where certain segments of interest are of higher importance than others). In addition, one or more rules may determine which of the segments of interests should be analyzed when two or more segments of interest are identified.

The segment analysis module 206 may determine two or more contexts from the segments of interest. In such cases, the emoticon suggestion system 200 may search for candidate emoticons associated with all of the determined contexts, or may only search for candidate emoticons that match one or more of the most important contexts (e.g., determined based on rules).

To determine a context of one or more segments of interest, the segment analysis module 206 may semantically analyze the segments of interest present in the input field. Those of skill in the art will appreciate that the semantic analysis of segments may be performed in accordance with one or more techniques known in the art. When analyzing the context of one or more segments of interest, the segment analysis module 206 may determine a subtext or a meaning for the segments of interest. Based on the subtext or meaning identified for the segments of interest, the emoticon suggestion system 200 may identify one or more candidate emoticons for suggestion. The subtext of a segment of interest may identify a mood or an emotion for that segment of interest. Example subtexts for segments of interest may include, without limitation, happiness, sadness, indifference, anger, resentment, contrition, or excitement. The meaning for segments of the interest may identify an explicit meaning for segments of interest. For example, where a segment of interest recites "I just got a new job!," the segment analysis module 206 may identify the meaning for the segment of interest as "new job."

It should be noted that for some embodiments, the segment analysis module 206 may identify and analyze segments of interest in at or near real-time as the user adds characters or emoticons to or removes characters or emoticons from the input field using the input module 204.

The emoticon search module 208 may search for one or more candidate emoticons based on an identified context (e.g., subtext or meaning) of a segment of interest. In some embodiments, the emoticon search module 208 may search the emoticon datastore 214 for emoticons associated with the one or more contexts identified by the emoticon suggestion system 200. As described herein, the emoticon datastore 214 may comprise emoticons available for entry into the input field, and associations between an emoticon and one or more contexts.

As noted herein, the association between a given emoticon and a given context may comprise statistical usage of the given emoticon with that given context. The strength of the association between the given emoticon and the given context may be based on such statistical usage. Additionally, the statistical usage may be based on the user's own usage of the given emoticon with the given content, or may be based on usage of the given emoticon with the given content by a community of users (e.g., usage of a given emoticon in a given context on a social networking website).

Generally, the more usage of a given emoticon with a given context, the stronger the association between that given emoticon and that given context. For some embodiments, the strength of the association between an emoticon and a context may indicate the confidence in suggesting the emoticon for that context. The strength of the association may also be used to prioritize and present the one or more candidate emoticons from the highest strength to the lowest strength.

In some embodiments, the search for one or more candidate emoticons by the emoticon search engine module 208 may consider the strength of the association between the emoticon and the context. For example, the emoticon search engine module 208 may only identify an emoticon as a candidate emoticon if the strength of the association between the emoticon and the target context meets or exceeds a predetermined threshold. Additionally, the emoticon search engine module 208 may only identify an emoticon as a candidate emoticon when the strength of the association between the emoticon and the target context meets or exceeds a threshold relative to other, potential candidate emoticons.

As noted herein, in various embodiments, the emoticon search module 208 may further narrow the search for candidate emoticons by utilizing user preferences, user-related information, recipient-related information, or some combination thereof. Examples of user preferences may include, without limitation, a preference to suggest user-customized emoticons before other types of emoticons, and a preference to ignore certain categories of emoticons (e.g., suggest only emoticons that are age appropriate with respect to the user). Examples of recipient-related information may include, without limitation, a user interest, a user ethnicity, a user religion, a user geographic location, a user age, a user relational status, and a user occupation. Examples of user-related information may include, without limitation, a recipient's relation to a user, a recipient interest, a recipient ethnicity, a recipient religion, a recipient geographic location, a recipient age, a recipient relational status, and a recipient occupation. In certain embodiments, when searching for one or more candidate emoticons, the emoticon search module 208 may further consider the input field's limitations in receiving character or graphical emoticons and search for candidate emoticons accordingly.

The emoticon suggestion module 210 may receive the one or more candidate emoticons located based on an identified context of a segment of interest, and present the one or more candidate emoticons to the user for selection. As noted herein, in some embodiments, the emoticon suggestion module 210 may use the display module 202 to display for entry selection the one or more candidate emoticons at or near the current position of the input cursor in the input field. As also noted herein, in various embodiments, the emoticon suggestion module 210 may use the input module 202 to display for entry selection the one or more candidate emoticons through a physical input device or a virtual input device.

The emoticon selection module 212 may receive from the user an entry selection for one or more candidate emoticons suggested to the user. In particular embodiments, the emoticon selection module 212 may receive the entry selection for the one or more candidate emoticons through the input module 204, and the emoticon selection module 212 may enter the one or more selected emoticons into the input field. As noted herein, the emoticon selection module 212 may enter the one or more selected emoticons at the current position of the input cursor. For some embodiments, the emoticon selection module 212 may enter the one or more selected emoticons into the input field by replacing segments or segments of interest within the input field with the one or more selected emoticons. Additionally, some embodiments may enable the user to set the emoticon selection module 212 (e.g., using a user preference) such that the module 212 auto-selects suggested emoticons based on certain guidelines. For instance, the user may configure the emoticon selection module 212 such that the first suggested emoticon is selected when an emoticon suggestion is made.

In some embodiments, where associations between emoticons and contexts comprise statistical usage of such emoticons with such contexts, the emoticon selection module 212 may update the statistical usage information based on the entry selection received from the user. In particular, the emoticon selection module 212 may receive the entry selection of one or more candidate emoticons for a given context, and update the statistical usage information stored between the selected candidate emoticons and their respective contexts of usage. Depending on the embodiment, the emoticon selection module 212 may update the statistical usage information on the emoticon datastore 214.

The emoticon datastore 214 may comprise a library of emoticons available for suggestion by the emoticon suggestion system 200, and associations between emoticons in the library and contexts (e.g., subtexts and meanings). The emoticon search module 208 may access the emoticon datastore 214 when searching for one or more candidate emoticons that are associated with one or more particular contexts. As noted herein, for some embodiments, the emoticon datastore 214 may comprise two or more associations between a given emoticon and a given context (e.g., subtext or meaning). Additionally, the association between a given emoticon and a given context may comprise statistical usage of the given emoticon with the given context. Such statistical usage may reflect the strength of the association between the emoticon and the context.

Emoticons stored on the emoticon datastore 214 may include character emoticons, graphical emoticons, graphically animated emoticons, and emoticons accompanied by sound. For some embodiments, the emoticon datastore 214 may further comprise user preferences, user information or recipient information, which may be utilized by the embodiments when identifying emoticons suitable for suggestion. For example, the emoticon datastore 214 may store a user preference that causes an embodiment to suggest user-defined or user-uploaded emoticons before suggesting emoticons generally available to any user. In another example, the emoticon datastore 214 may store a user preference that causes an embodiment to automatically insert the first emoticon suggested to the user by the embodiment, or to automatically insert the suggested emoticon having the highest usage in a given context.

Those skilled in the art would appreciate that a variety of emoticon libraries and a variety of association between emoticons and contexts may be stored on the emoticon datastore 214.

It will be appreciated that a "module" may comprise software, hardware, firmware, and/or circuitry. In one example one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, the functions of the various modules may be combined or divided differently. For example, the functions of various modules may be distributed amongst one or more modules residing at an emoticon suggestion server and one or more modules reside at an emoticon suggestion client.

Figure 3:
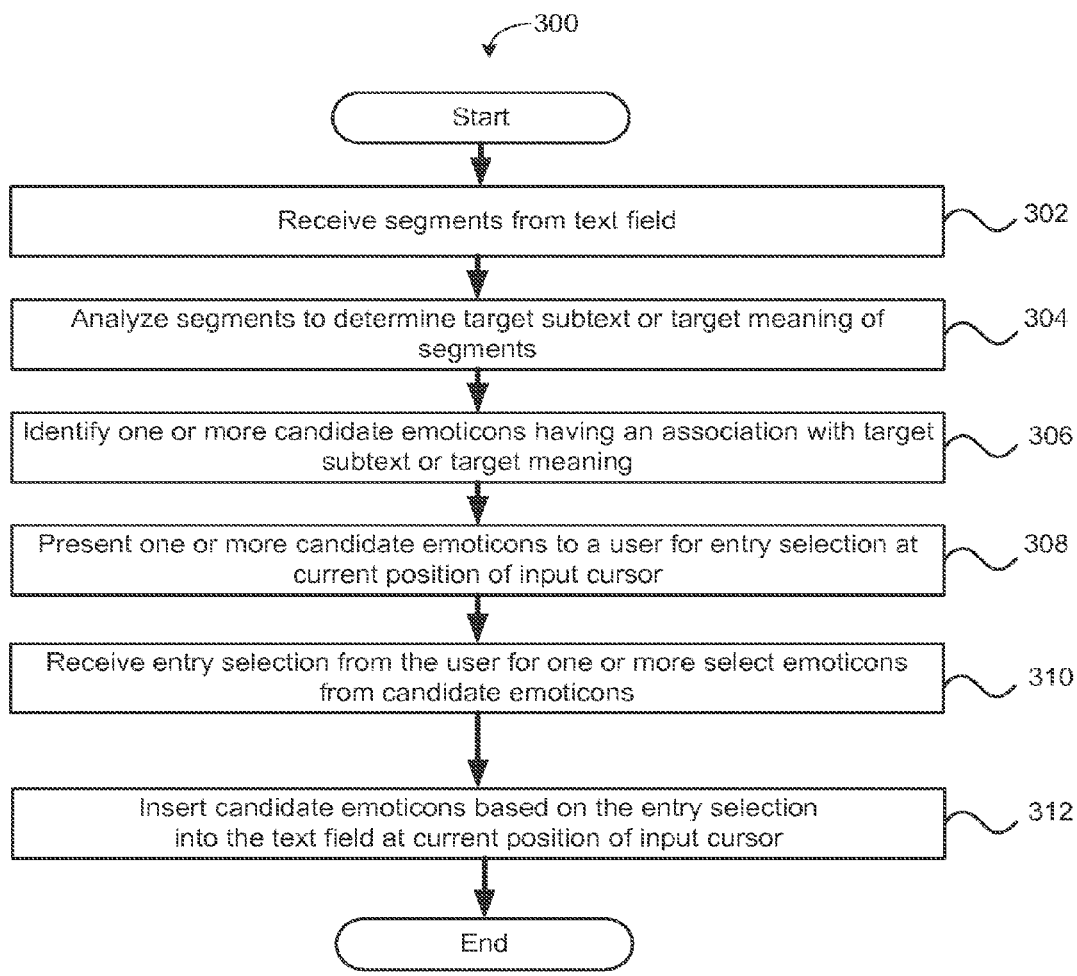
FIG. 3 is a flow chart of an exemplary method for identifying and suggesting an emoticon in accordance with some embodiments.

FIG. 3 is a flow chart of an exemplary method 300 for identifying and suggesting an emoticon in accordance with some embodiments. In step 302, the segment analysis module 206 may receive one or more segments from an input field, which may be displayed through the display module 202. As noted herein, upon receiving the one or more segments, the segment analysis module 206 may identify segments of interest for context analysis purposes.

In step 304, the segment analysis module 206 may analyze the one or more segments to determine one or more target subtexts or one or more target meanings of the segments. The target subtexts and the target meanings of the segments provide for one or more contexts associated with the segments. Depending on the embodiment, the segment analysis module 206 may analyze only those segments which have been identified as segments of interest by the segment analysis module 206.

In step 306, the emoticon search module 208 may identify one or more candidate emoticons having an association with the one or more target contexts or one or more target meanings, which may have been determined by the segment analysis module 206. In some embodiments, the emoticon search module 208 may identify one or more candidate emoticons in the emoticon datastore 214 which have an association with the target subtexts or the target meanings. As noted herein, the strength of each association may be based on statistical usage of a given emoticon with a given context, and such strength may be taken into consideration as the emoticon search module 208 identifies one or more candidate emoticons.

In step 308, the emoticon suggestion module 210 may present the one or more candidate emoticons to a user for entry selection at a current position of an input cursor in an input field. As described herein, the input field and the input cursor therein may be displayed to the user through the display module 202. For some embodiments, the emoticon suggestion module 210 may present the one or more candidate emoticons to the user for entry selection using display module 202, and may display the candidate emoticons at or near the current position of the input cursor in the input field. Additionally, the emoticon suggestion module 210 may present the one or more candidate emoticons to the user for entry selection through one or more input devices of the input module 204. For example, the emoticon suggestion module 210 may present the one or more candidate emoticons to the user through a physical input device, such as a physical keyboard having a display, or through a virtual input device, such as an on-screen keyboard.

In step 310, the emoticon selection module 212 may receive an entry selection from the user for one or more select emoticons from the one or more candidate emoticons. For some embodiments, the emoticon selection module 212 may receive the entry selection from the input module 204. Additionally, upon receiving the entry selection, the emoticon selection module 212 may update the statistical usage information on the emoticon datastore 214 for the one or more candidate emoticons based on the entry selection, thereby strengthening or weakening the association between the candidate emoticons and particular contexts.

In step 312, based on the entry selection, the emoticon selection module 212 may insert the one or more candidate emoticons into the text field at the current position of the input cursor received by the emoticon selection module 212. As noted herein, in some embodiments, entry of the candidate emoticons into the input field may involve replacing one or more segments in the input field with the selected emoticons.

Figure 4:
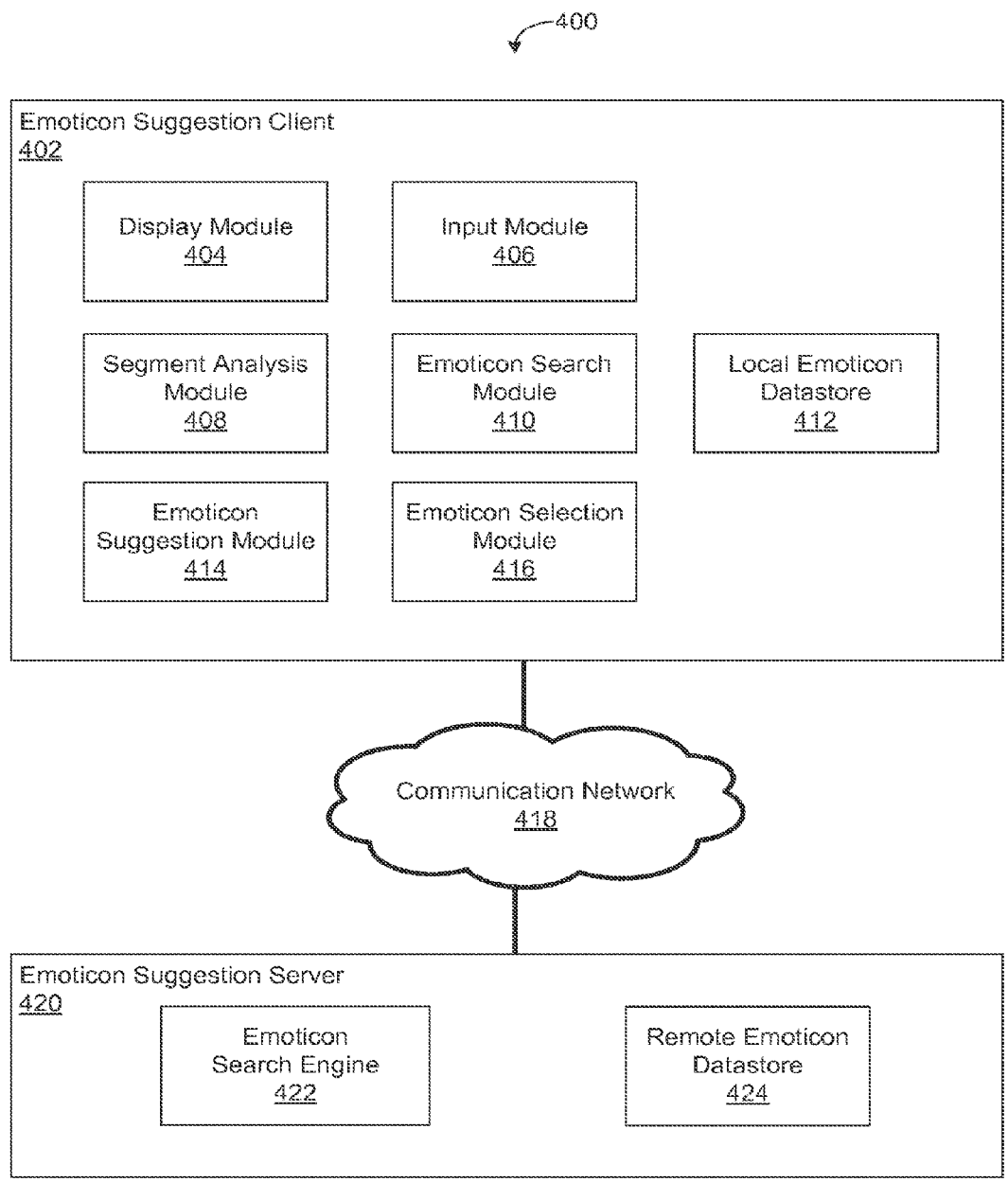
FIG. 4 is a block diagram of an exemplary emoticon suggesting system using a client-server architecture in accordance with some embodiments.

FIG. 4 is a block diagram of an exemplary emoticon suggesting system 400 using a client-server architecture in accordance with some embodiments. The emoticon suggesting system 400 may comprise an emoticon suggestion client 402 and an emoticon suggestion server 420. In some embodiments, the emoticon suggestion client 402 may be similar to the digital device described in FIG. 7, or to the computing devices described in FIG. 1 (i.e., tablet computing device 104, the smartphone computing device 108, and the desktop computing device 112), and the emoticon suggestion server 420 may be similar to the digital device described in FIG. 7, or to the emoticon suggestion server 116 described in FIG. 1. The emoticon suggestion client 402 and the emoticon suggestion server 420 may communicate with one another over a communication network 418.

The emoticon suggestion client 402 may comprise a display module 404, an input module 406, a segment analysis module 408, an emoticon search module 410, a local emoticon datastore 412, an emoticon suggestion module 414, and an emoticon selection module 416. The emoticon suggestion server 420 may comprise an emoticon search engine 422, and a remote emoticon datastore 424.

At the emoticon suggestion client 402, the display module 404 may display an input field into which a user can input one or more segments, character emoticons, or graphical emoticons using the input module 406. Typically, as segments and emoticons are entered into the input field they appear in the input field. With the input field, the display module 404 may display an input cursor in the input field, where the input cursor indicates where a user's character inputs will be next entered or where an emoticon may be next entered.

Various embodiments may suggest emoticons based on a number of factors including, for example, the current position of the input cursor within the input field, the present segment content of the input, user-related information, recipient-related information, user preferences, or some combination thereof. The candidate emoticons, once identified, may be suggested to the user via the display module 404. Specifically, the display module 404 may, for the user's selection, display the candidate emoticons at or near the current position of the input cursor in the input field. Depending on the embodiment, the display module 404 may display the candidate emoticons at or near the input field via a callout box.

Through the display module 404, a digital device, may display all graphical output from the digital device. In some embodiments, the display module 404 may display the input field as part of a graphical user interface (GUI). Depending on the embodiment, the input field may be a graphical component of an application operating on a digital device, or may be a graphical representation of a document viewable or editable through an application operating on the digital device. It will be appreciated by those of ordinary skill in the art that the input field may vary in type and size from embodiment to embodiment.

The input module 406 may receive character input from a user and enter such character input into the input field as received. As character input is entered into the input field, the display module 404 may update the input field with the character input. Additionally, the input module 406 may further receive entry selections for emoticons suggested in accordance with various embodiments. Generally, upon selection, the selected emoticons may be inserted at the current position of the input cursor in the input field. As noted herein, the input module may comprise a physical input device that is externally coupled to a digital device or that is physical embedded into the digital device, or a virtual input device, such as an on-screen keyboard, which may be provided to the user through the display module 404. In various embodiments, as virtual input devices are employed, such virtual input devices may be displayed at or near the input field to which segments will be inputted.

For some embodiments, suggested emoticons may be presented to the user through the input module 406. For example, where input module 406 comprises a physical keyboard, the physical keyboard may be configured to display suggested emoticons through the physical keyboard. For some embodiments, the physical keyboard may display suggested emoticons by way of keys or buttons that comprise embedded displays (e.g., LCD buttons), or by way of a display embedded on a surface of the physical keyboard (e.g., at the top of the keyboard). The suggested emoticons may be displayed through the physical keyboard in color or in grayscale. As the suggested emoticons are displayed through the physical keyboard, the user may select one or more of those suggested emoticons through keys or buttons of the physical keyboard.

In some embodiments, where the input module 406 comprises an on-screen keyboard, the appearance of the on-screen keyboard may be reconfigured to display the suggested emoticons through the on-screen keyboard. For example, the appearance of the on-screen keyboard may be reconfigured so that certain buttons of the on-screen keyboard are replaced with suggested emoticons buttons, or so that the on-screen keyboard is augmented with additional suggested emoticon buttons. Once presented to through the on-screen keyboard, the suggested emoticon buttons may be used by a user to select from the one or more suggested emoticons.

The segment analysis module 408 may analyze one or more segments present in the input field and determine a context for the segments analyzed. As described herein, the context determined by the segment analysis module 408 may be subsequently utilized when identifying candidate emoticons to be suggested to the user. In various embodiments, the segment analysis module 408 may first identify segments of interest in the input field and then only analyze those segments of interest when determining the context of segments in the input field.

In some embodiments, the segment analysis module 408 may perform syntactical analysis of the segments currently present in the input field when identifying segments of interest. Additionally, the segment analysis module 408 may identify the segments of interest based on conditional or non-conditional rules that guide the segment of interest identification process.

To determine a context of one or more segments of interest, the segment analysis module 408 may semantically analyze the segments of interest present in the input field. When analyzing the context of one or more segments of interest, the segment analysis module 408 may determine a subtext or a meaning of the segments of interest. The subtext of a segment of the interest may identify a mood or an emotion for that segment of interest. Based on the subtext or meaning identified for the segments of interest, the emoticon suggestion system 400 may identify one or more candidate emoticons for suggestion.

It should be noted that for some embodiments, the segment analysis module 408 may identify and analyze segments of interest in at or near real-time as the user adds characters or emoticons to or removes characters or emoticons from the input field using the input module 408.

The emoticon search module 410 may search for one or more candidate emoticons based on an identified context (e.g., subtext or meaning) of a segment of interest. In some embodiments, the emoticon search module 410 may access the local emoticon datastore 412 when searching for one or more candidate emoticons that are associated with one or more particular contexts.

Depending on the embodiment, the local emoticon datastore 412 may store user-customized emoticons, a user's favorite or preferred emoticons, associations between emoticons stored on the local emoticon and contexts (e.g., subtext or meaning), user preferences with respect to identifying and suggestion emoticons, user-related information, or recipient-related information. Additionally, local emoticon datastore 412 may be utilized to locally cache previously suggested emoticons or suggested emoticons previously selected by the user.

In some embodiments, the emoticon search module 410 may utilize the emoticon suggestion server 420 to search for and provide candidate emoticons to the emoticon suggestion client 402. For example, the emoticon suggestion server 420 may search for candidate emoticons on the remote emoticon datastore 424 and provide resulting candidate emoticons to the emoticon search module 410 on the emoticon suggestion client 402. The emoticon suggestion server 420 may use the emoticon search engine 422 to search for candidate emoticons on the remote emoticon datastore 424, to retrieve candidate emoticons from the remote emoticon datastore 424, and to provide the candidate emoticons to the emoticon search module 410.

The remote emoticon datastore 424 may comprise a library of emoticons available for suggestion to the emoticon suggestion client 402. The remote emoticon datastore 424 may further comprise associations between emoticons in the library and contexts. For certain embodiments, the associations comprise statistical usage of the given emoticon of the emoticons in the library with the context. Generally, such statistical usage may reflect the strength of the association between the emoticon and the context.

As noted herein, emoticons stored on the remote emoticon datastore 424 may include character emoticons, graphical emoticons, graphically animated emoticons, and emoticons accompanied by sound. For some embodiments, the remote emoticon datastore 424 may further comprise user preferences, user information or recipient information, which may be utilized the embodiments when identifying emoticons suitable for suggestion. Those skilled in the art would appreciate that a variety of emoticon libraries and a variety of association between emoticons and contexts can be stored on the remote emoticon datastore 424.

The emoticon suggestion module 414 may receive the one or more candidate emoticons located based on an identified context of a segment of interest, and present the one or more candidate emoticons to the user for selection. As noted herein, in some embodiments, the emoticon suggestion module 414 may use the display module 414 to display for entry selection the one or more candidate emoticons at or near the current position of the input cursor in the input field. As also noted herein, in various embodiments, the emoticon suggestion module 414 may use the input module 406 to display for entry selection the one or more candidate emoticons through a physical input device or a virtual input device.

The emoticon selection module 416 may receive from the user an entry selection for one or more candidate emoticons suggested to the user. In particular embodiments, the emoticon selection module 416 may receive the entry selection for the one or more candidate emoticons through the input module 404, and the emoticon selection module 416 may enter the one or more selected emoticons into the input field. The emoticon selection module 416 may enter the one or more selected emoticons at the current position of the input cursor. Additionally, the emoticon selection module 416 may enter the one or more selected emoticons into the input field by replacing segments or segments of interest within the input field with the one or more selected emoticons. Some embodiments may enable the user to set the emoticon selection module 416 (e.g., using a user preference) such that the module 416 auto-selects suggested emoticons based on certain guidelines. For instance, the user may configure the emoticon selection module 416 such that the first suggested emoticon is selected when an emoticon suggestion is made.

In some embodiments, where associations between emoticons and contexts comprise statistical usage of such emoticons with such contexts, the emoticon selection module 416 may update the statistical usage information based on the entry selection received from the user. In particular, the emoticon selection module 416 may receive the entry selection of one or more candidate emoticons for a given context, and update the statistical usage information stored between the selected candidate emoticons and their respective contexts of usage.

Depending on the embodiment, the emoticon selection module 416 may update the statistical usage information on the local emoticon datastore 412 or on the remote emoticon datastore 424. For example, if the one or more candidate emoticons selected through the emoticon selection module 416 were provided from the emoticon suggestion server 420, the statistical usage information for those candidate emoticons will be updated on the remote emoticon datastore 424. In another example, if the one or more candidate emoticons selected through the emoticon selection module 416 were provided from the local emoticon datastore 412, the statistical usage information for those candidate emoticons will be updated on the locate emoticon datastore 412.

Figure 5:
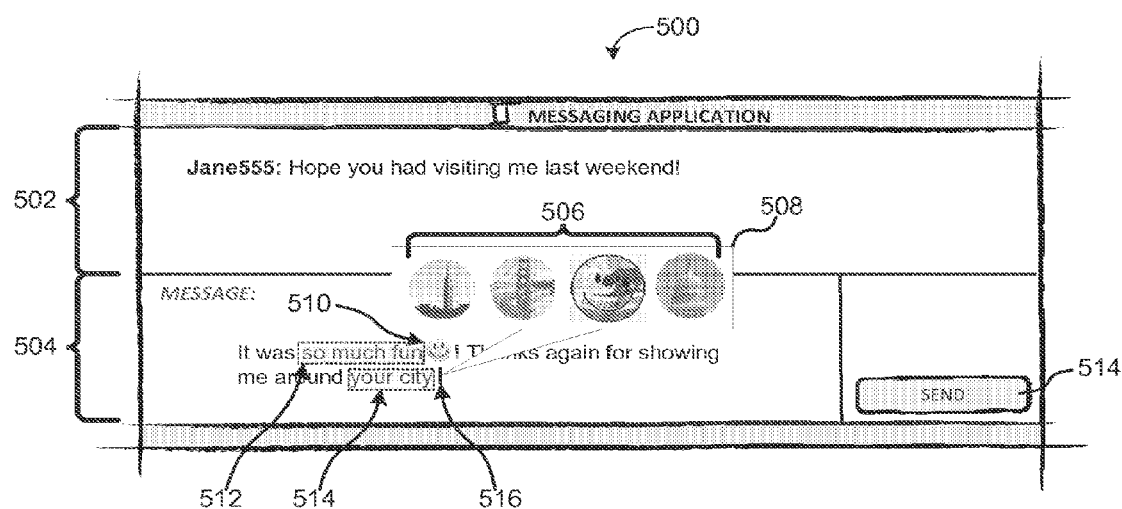
FIG. 5 depicts a user interface of a messaging application, where the messaging application utilizes an embodiment.

FIG. 5 depicts a user-interface 500 of a messaging application, where the messaging application utilizes an embodiment. In some embodiments, a user may utilize the user interface 500 to receive and review messages received from other users over online chat, and to compose and transmit messages to other users over online chat. The messaging application may be or include a client on an instant messaging system, where the messaging application is operating on a digital device local to the user, such a smartphone computing device or a laptop. The instant messaging system may operate on another digital device such as a server, where the messaging application interfaces with the instant messaging system. Depending on the embodiment, the messaging application may operate on a digital device as a standalone application, or as an applet, plug-in, or script operating through a web browser.

The user interface 500 of the messaging application may comprise a conversation pane 502, a message input field 504, and a send button 514. For some embodiments, the conversation pane 502 may comprise messages submitted to the online chat. As such, the conversation pane 502 may include messages submitted to the online chat from others, and messages submitted by the user through the user interface 500. The user may submit messages to the online chat using the message input field 504. In particular, the user may enter a message into the message input field 504 and press the send button 514 when the user desires to submit the message to the online chat.

The message input field 504 may comprise and may be configured to receive a message prepared by the user for submission to the online chat. The message input field 504 may receive one or more segments from the user, or may receive one or more emoticons entered in accordance with some embodiments. The message input field 504 may further comprise an input cursor 516.

As the user prepares a message in the message input field 504, various embodiments may suggest emoticons for entry at the current position of the input cursor 516. For example, as the user writes "It was so much fun" in the message input field 504, the embodiment may suggest a "smiley face" graphical emoticon 510 for entry into the input field 504 based on the embodiment's analysis of the segment of interest 512, which recites "so much fun." The embodiment may suggest the "smiley face" graphical emoticon 510 based on an association between the "smiley face" graphical emoticon 510 and the context of the segment of interest 512. Once the user selects the "smiley face" graphical emoticon 510, the embodiment may enter the "smiley face" graphical emoticon 510 into the message input field 504.

Likewise, as the user writes "Thanks again for showing me around your city" in the message input field 504, the embodiment may suggest a plurality of graphical emoticons 506 based on the context analysis of the segment of interest 514. As noted herein, the embodiment may present the suggested, graphical emoticons 506 by displaying the graphical emoticons 506 in a callout box 508 positioned at or near the current position of the input cursor 516. Based on analysis of the segment of interest 514, which recites "your city," the embodiment may suggest the graphical emoticons 506, which relate to cities.

FIG. 6 depicts a user-interface 600 of a messaging application, where the messaging application utilizes an embodiment. Like in FIG. 5, a user may utilize the user interface 600 to receive and review messages received from other users over online chat, and to compose and transmit messages to other users over online chat. The messaging application may be or include a client on an instant messaging system, where the messaging application is operating on a digital device local to the user, such a smartphone computing device or a laptop. The instant messaging system may operate on another digital device such as a server, where the messaging application interfaces with the instant messaging system. Depending on the embodiment, the messaging application may operate on a digital device as a standalone application, or as an applet, plug-in, or script operating through a web browser.

The user interface 600 of the messaging application may comprise a conversation pane 602, a message input field 604, an on-screen keyboard 606, and a send button 616. For some embodiments, the conversation pane 602 may comprise messages submitted to the online chat, including messages submitted by the user through the user interface 600. The user may submit messages to the online chat using the message input field 604. Specifically, the user may enter a message into the message input field 604 using the on-screen keyboard 606, and may press the send button 616 when the user desires to submit the message to the online chat.

The message input field 604 may comprise and may be configured to receive a message prepared by the user for submission to the online chat. The message input field 604 may receive one or more segments from the user through the on-screen keyboard 606, or may receive one or more emoticons as selected through the on-screen keyboard 606. The message input field 604 may further comprise an input cursor 610.

The on-screen keyboard 606 may comprise a QWERTY keyboard, a button 624 to hide the on-screen keyboard 606 from view (e.g., when not in use), and an emoticon menu 622. Through the emoticon menu 622, the user may select one or more emoticons for entry into the message input field 604 at the current position of the input cursor 610. The emoticon menu 622 may comprise emoticons from a default emoticon library, or a selection of emoticons suggested by the embodiment. A left select button 618 and a right select button 620 may allow the user to scroll and browse through the emoticons available for entry selection through the emoticon menu 622.

As the user prepares a message in the message input field 604, various embodiments may suggest emoticons for entry at the current position of the input cursor 610. For instance, as the user writes "I never would have thought the football" in the message input field 604, the embodiment may suggest a "football" graphical emoticon 614 for entry into the input field 604 based on the embodiment's analysis of the segment of interest 612, which recites "football." The embodiment may suggest the "football" graphical emoticon 614 based on an association between the "football" graphical emoticon 614 and the context of the segment of interest 612. Once the user selects the "football" graphical emoticon 614, the embodiment may enter the "football" graphical emoticon 614 into the message input field 604.

Similarly, as the user writes "The 50-yard field goal" in the message input field 604, the embodiment may suggest a plurality of "field goal" graphical emoticons based on the context analysis of the segment of interest 608. In particular, the embodiment may present the "field goal" graphical emoticons for entry selection by displaying the graphical emoticons in the emoticon menu 622, which may be displayed as part of the on-screen keyboard 606.

Figure 7:
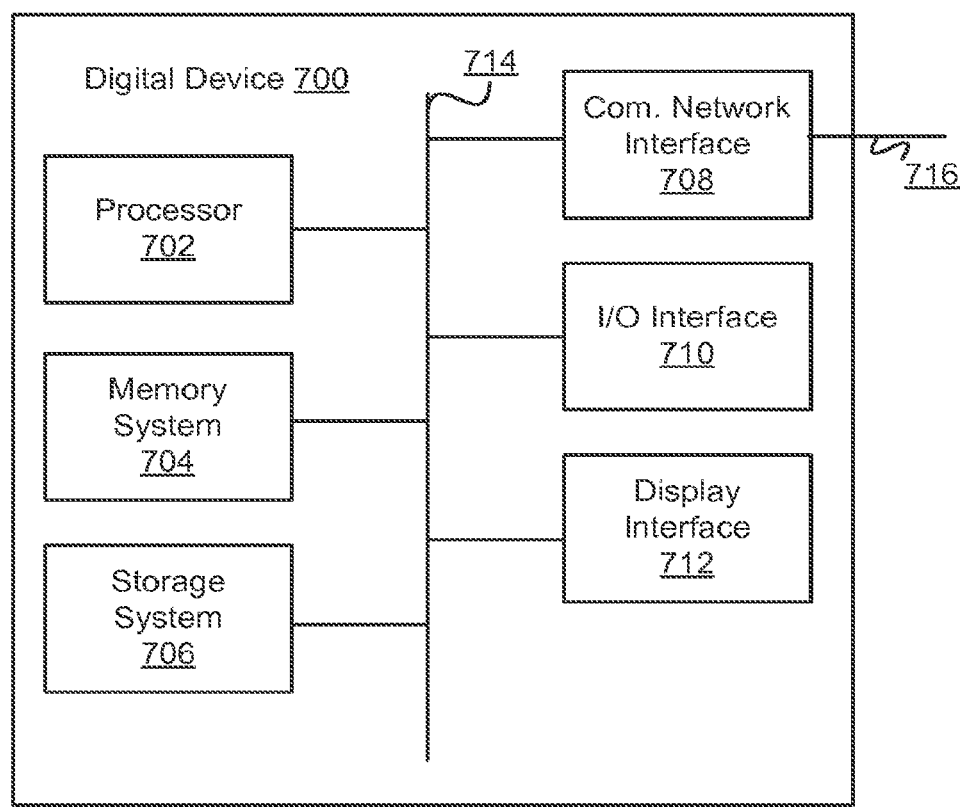
FIG. 7 is a block diagram of an exemplary digital device.

FIG. 7 is a block diagram of an exemplary digital device 700. The digital device 700 comprises a processor 702, a memory system 704, a storage system 706, a communication network interface 708, an I/O interface 710, and a display interface 712 communicatively coupled to a bus 714. The processor 702 is configured to execute executable instructions (e.g., programs). In some embodiments, the processor 702 comprises circuitry or any processor capable of processing the executable instructions.

The memory system 704 is any memory configured to store data. Some examples of the memory system 704 are storage devices, such as RAM or ROM. The memory system 704 can comprise the ram cache. In various embodiments, data is stored within the memory system 704. The data within the memory system 704 may be cleared or ultimately transferred to the storage system 706.

The storage system 706 is any non-transitory storage configured to retrieve and store data. Some examples of the storage system 706 are flash drives, hard drives, optical drives, and/or magnetic tape. In some embodiments, the digital device 700 includes a memory system 704 in the form of RAM and a storage system 706 in the form of flash data.

Both the memory system 704 and the storage system 706 comprise computer readable media which may store instructions or programs that are executable by a computer processor including the processor 702.

The communication network interface (com. network interface) 708 can be coupled to a network (e.g., communication network 110) via the link 716. The communication network interface 708 may support communication over an Ethernet connection, a serial connection, a parallel connection, or an ATA connection, for example. The communication network interface 708 may also support wireless communication (e.g., 802.11 alb/gin, WiMax). It will be apparent to those skilled in the art that the communication network interface 708 can support many wired and wireless standards.

The optional input/output (I/O) interface 710 is any device that receives input from the user and output data. The optional display interface 712 is any device that is configured to output graphics and data to a display. In one example, the display interface 712 is a graphics adapter. It will be appreciated that not all digital devices 700 comprise either the I/O interface 710 or the display interface 712.

It will be appreciated by those skilled in the art that the hardware elements of the digital device 700 are not limited to those depicted in FIG. 7. A digital device 700 may comprise more or less hardware elements than those depicted. Further, hardware elements may share functionality and still be within various embodiments described herein. In one example, encoding and/or decoding may be performed by the processor 702 and/or a co-processor located on a GPU (Ie., Nvidia).

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accordance with some embodiments. Those skilled in the art are familiar with instructions, processor(s), and storage medium.

Referring again to FIG. 2, in various implementations, the emoticon suggestion system 200 suggests emoticons to users based on a detected sentiment in user-generated text. For example, the segment analysis module 206 may analyze one or more segments present in the input field and determine a sentiment for the segments analyzed. In general, the sentiment may relate to a user's subjective impressions (e.g., feelings, attitudes, emotions, and/or opinions), rather than facts. For example, the user may be for or against something (e.g., a product or a political view), may like or dislike something, may think something is better than something else, etc. The emoticon suggestion system 200 may detect such user sentiment and identify candidate emoticons for users based at least in part on the such sentiment.

In some instances, the segment analysis module 206 identifies segments of interest in the input field, and then analyzes those segments of interest to determine a sentiment. Generally, the segments of interest are identified in relation to a current position of an input cursor in the input field. Additionally, for some implementations, the segment analysis module 206 may perform syntactical analysis of the segments currently present in the input field when identifying segments of interest.

Where more than one segment of interest is identified, segment analysis module 206 may analyze the sentiment of each of the segments of interest, or may analyze the sentiment of all but the least important segments of interest (e.g., based on a weight system, where certain segments of interest are of higher importance than others). In addition, one or more rules may determine which of the segments of interests should be analyzed when two or more segments of interest are identified.

The segment analysis module 206 may determine two or more sentiments (e.g., "angry" and "sad") from the segments of interest. In such cases, the emoticon suggestion system 200 may search for candidate emoticons associated with all of the determined sentiments, or may only search for candidate emoticons that match one or more of the most important sentiments (e.g., determined based on rules).

To determine a sentiment of one or more segments of interest, the segment analysis module 206 may semantically analyze the segments of interest present in the input field. Those of skill in the art will appreciate that the semantic analysis of segments may be performed in accordance with one or more techniques known in the art. When analyzing the sentiment of one or more segments of interest, the segment analysis module 206 may identify a mood or an emotion for the segments of interest. Example sentiments for segments of interest may include, without limitation, happiness, sadness, indifference, anger, resentment, contrition, excitement, approval, disapproval, agreement, and disagreement.

To determine a sentiment of one or more segments of interest, the segment analysis module may perform sentiment analysis or opinion mining. In general, sentiment analysis refers to the use of text analysis, statistics, computation linguistics, and/or natural language processing to locate and analyze subjective information in one or more segments of interest. A goal of sentiment analysis is to identify an attitude of the writer or user, for example, with respect to something (e.g., a topic or issue) in a segment of interest. The attitude may be the user's emotional or affective state, the user's intended emotional effect, or the user's judgment or evaluation of a topic or issue.

In certain instances, sentiment analysis is used to identify the polarity of a text segment (i.e., whether the expressed opinion in the text is positive, negative, or neutral). The sentiment analysis may utilize classifiers such as Max Entropy and/or support vector machines (SVM), which may or may not utilize a neutral class.

In various implementations, the segment analysis module 206 monitors and reviews text segments as they are entered by a user to evaluate the user's sentiment in real-time or near real-time. As a simple example, when a user enters a message that includes the phrase "I feel happy today," the segment analysis module 206 may recognize that the user is likely happy and propose an appropriate emoticon (e.g., a smiley face) to the user for insertion into the text. Likewise, when a enters a message that includes the phrase "I feel upset," the segment analysis module 206 may recognize that the user is sad or angry and propose an appropriate emoticon (e.g., a sad or angry face) to the user for insertion into the text.

Further, as the user enters a message, the words and segments may be translated into one or more languages used by the intended recipients of the message. Translating the message (e.g., in real-time) may facilitate the sentiment analysis of the message. For example, the segment analysis module 206 may be able to assess sentiment more easily in one language (e.g., English) than in another language (e.g., Russian).

Some implementations of sentiment analysis utilize a scaling system in which segments or terms commonly associated with negative, neutral, or positive sentiment are associated with a number on a scale (e.g., −10 to +10), ranging from most negative to most positive. For example, the segment analysis module 206 may access or include a library of terms associated with sentiment, with each term assigned a numerical value on the scale. When the user enters a term with a high positive value (e.g., "love"), the segment analysis module 206 will recognize that the user's sentiment is likely positive. Likewise, when a user enters a term with a negative value (e.g., "hate") or a neutral value (e.g., "indifferent"), the segment analysis module 206 will recognize that the user's sentiment is likely negative or neutral, respectively. In certain instances, when more than one sentiment is detected in a segment, the segment analysis module 206 may add up the numerical values for the terms in the segment to arrive at a total numerical value for the segment. The total numerical value may be used to classify the segment as being, for example, either negative, neutral, or positive. In some instances, when a score for a segment is either highly negative or highly positive, the segment analysis module 206 may recognize that the user sentiment in the segment is extreme, and may identify candidate emoticons associated with the extreme sentiment for insertion by the user.

In various embodiments, when natural language processing is used to analyze a segment of interest, the segment analysis module 206 may review text segments to identify concepts or subjects associated with user sentiment. For example, when the user inserts one or more words indicating that sentiment is positive, the segment analysis module 206 may search other portions of text (e.g., before or after the sentiment words) to determine why the user sentiment is positive. The segment analysis module 206 may identify, for example, that the positive user sentiment is associated with a particular concept (e.g., a person or object) described elsewhere in the text segment. In such an instance, the segment analysis module 206 may associate the user sentiment with the concept. The concept may be given a score indicating a relationship between the user sentiment and the concept.

In some situations, the subjectivity/objectivity of one or more segments of interest is identified, which may involve classifying a given text (e.g., a segment of interest) as being either objective or subjective. Because the subjectivity of segments may depend on the context, and because an objective work may include subjective sentences (e.g., insertion of another person's opinion), this task may be more challenging that polarity classification. In some embodiments, objective segments are ignored before the polarity or sentiment of remaining text is classified.

Some implementations of the segment analysis module 206 utilize a feature/aspect-based sentiment analysis in which opinions or sentiments are determined for different aspects or features of entities (e.g., a car, a business, or an electronic item). Such an analysis may involve several sub-problems, such as identifying entities, extracting features/aspects for the entities, and classifying any sentiment on the features/aspects as being positive, negative, or neutral.

Figure 8:
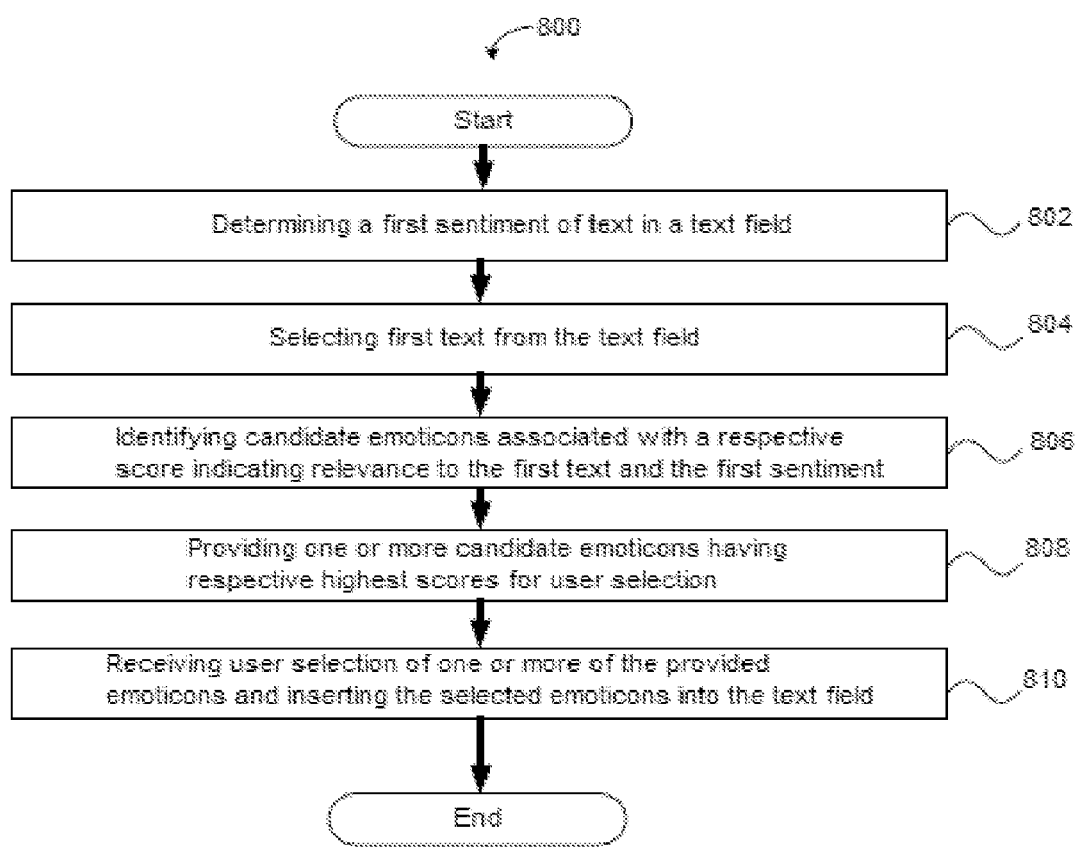
FIG. 8 is a flowchart of an example method for inserting an emoticon based on a detected sentiment in a segment of text.

Referring to FIG. 8, in certain implementations, a method 800 is provided for suggesting and inserting emoticons corresponding to detected sentiment in a text message. The method includes determining (step 802) a sentiment of text in a text field, e.g., as a user is inputting text in the text field. The text (e.g., a segment, a sentence fragment, or other portion of text) is selected (step 804) from the text field, preferably in proximity to a current position of an input cursor in the text field. One or more candidate emoticons are identified (step 806), wherein each candidate emoticon is associated with a respective score (e.g., a numerical value) indicating relevance of the candidate emoticon to the text and the sentiment. The candidate emoticons are identified based on, at least, historical user selections of emoticons for insertion in proximity to other text (which may or may not be the same as the selected text) having a respective sentiment. For example, the method may include reviewing a history of emoticons selected by users and identifying candidate emoticons based on emoticons that were selected previously by users for use with similar text and/or sentiment as the selected text. Such previously selected emoticons may have higher respective scores than other emoticons that have not been previously selected. One or more candidate emoticons that have respective highest scores are then provided (step 808) for user selection. In some instances, candidate emoticons having the highest scores may be associated with the sentiment of the selected text and/or may have been previously selected for insertion into text having a similar sentiment. The emoticons may be provided (e.g., displayed) to the user according to a respective score for each emoticon, such that emoticons with higher scores are presented first (e.g., in a list). A selection from the user of one or more of the provided emoticons is then received (step 810), and the one or more selected emoticons is inserted into the text field at the current position of the input cursor or in proximity to the current position.

In some implementations, candidate emoticons are determined by calculating a score that is based at least in part on a difference between natural language of the selected text and natural language of the text associated with a prior user selection of the candidate emoticon. For example, if the natural languages are the same, the candidate emoticon can be given a higher score. Likewise, if the selected text and the text associated with a prior user selection of the candidate emoticon include the same words in the same order, the candidate emoticon can be given a higher score.

In general, certain techniques may be used to determine differences between the selected text and previous text segments or messages. For example, in some instances, a Hamming distance is calculated for the selected text and a previous text segment. In general, the Hamming distance provides an indication of the minimum number of changes required to transform the selected text into the previous text segment. Each change may include, for example, a character substitution, a character deletion, and/or a character addition. For strings of equal length, the Hamming distance may be the number of positions at which the corresponding characters or symbols are different. In general, when the difference between the selected text and a previous text segment is small, a score associated with an emoticon used in the previous text segment or message may be high. A high score indicates the user will likely want to consider the emoticon for insertion into the current selected text or message.

In some implementations, a score for a candidate emoticon is based on a combination of one or more individual scores, which may be weighted. For example, the score may be based on a combination (e.g., a weighted sum) of separate scores for sentiment similarity, text similarity (e.g., Hamming distance), language similarity, and so on. Such an approach allows more than one characteristic of a text segment or message to be considered when computing the score. The approach may also allow some characteristics (e.g., sentiment) to be weighted more heavily than other characteristics (e.g., text similarity) when computing the score. The weights for the characteristics may be chosen, for example, by a user and/or a provider of the systems and methods described herein. This may allow users to receive emoticon suggestions that are based more heavily on some characteristics (e.g., sentiment) rather than other characteristics (e.g., text similarity). In one example, the score for a candidate emoticon is based at least in part on the number of times the candidate emoticon has been used for a given text segment or message (e.g., for a given word or sequence of words). When a particular candidate emoticon has been used more often than others (e.g., by a user, a group of users, or all users) for the given text, the score for the candidate emoticon may be high.

In various instances, the emoticon suggestion system 200 identifies candidate emoticons based at least partially on a preference of the user, user-related information, and/or recipient-related information. For example, the user may specify a preference to use emoticons that he or she has used previously or that are of a certain type (e.g., facial expressions). Information about the user (e.g., age, gender, educational background, career, hobbies, etc.) may also be used to identify candidate emoticons that are consistent with some aspect of the user and that the user would therefore be more likely to use. For example, a medical doctor may be more inclined to use emoticons related to the practice of medicine. As a further consideration, the emoticon suggestion system 200 may consider the target audience for the user's message and identify candidate emoticons based on any anticipated preferences that the audience may have. For example, if a message is directed to a person who prefers emoticons of a certain color (e.g., pink), the systems and methods may identify candidate emoticons that include that particular color.

Figure 9:
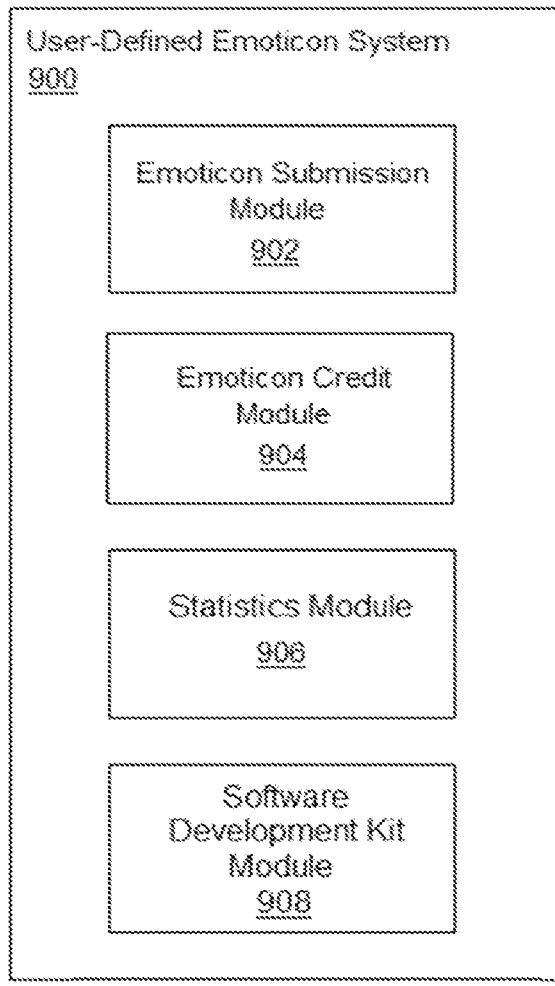
FIG. 9 is a schematic block diagram of an example user-defined emoticon system.

Referring to FIG. 9, in certain embodiments, a user-defined emoticon system 900 is provided that allows users to define (e.g., draw) emoticons, share user-defined emoticons with other users, receive credit for sharing user-defined emoticons, and receive information regarding the use of the user-defined emoticons by others. A user-defined emoticon may include a visual representation (e.g., a graphical image) and be associated with a respective natural language and/or respective text.

The user-defined emoticon system 900 includes an emoticon submission module 902 that enables a user to submit a user-defined emoticon. The emoticon submission module 902 may include a drawing tool that allows a user to draw or otherwise create an image for the emoticon. The user may propose a natural language meaning for the emoticon and/or a suggested use for the emoticon (e.g., for use in conjunction with hunger). In some instances, a user may create an emoticon but choose to limit the emoticon for personal use, rather than submitting the emoticon for use by other users. The user-defined emoticon system 900 may enable users to specify whether user-defined emoticons are to be retained for personal use only (i.e., private emoticons) or shared with other users (i.e., public emoticons).

The user-defined emoticon system 900 also includes an emoticon credit module 904 that allows users to receive credit for sharing their user-defined emoticons with other users. For example, the user-defined emoticon system 900 and/or the emoticon credit module 904 may interact with and/or be accessible from an electronic game or video game (e.g., a massively multiplayer online game). When a user creates a new emoticon and submits the emoticon for use by other users, the emoticon credit module 904 may provide a credit to an account of the user. For example, in exchange for submitting the user-defined emoticon, the user may receive points, virtual currency, and/or other virtual goods for use in the video game.

After a user-defined emoticon has been submitted by a user, a statistics module 906 allows the user to track the use of the emoticon by others. The statistics module 906 may inform the user about the number of times the emoticon has been used, the last time the emoticon was used, and the various languages with which the emoticon has been used. Based on the extent of use of the emoticon by others, the user's account may receive additional credit. Such credits may encourage users to create and share high-quality emoticons that others will want to use multiple times.

The user-defined emoticon system 900 may also utilize or include a software development kit module 908 that facilitates the creation of applications for generating and submitting user-defined emoticons, crediting user accounts, providing statistics, and providing emoticon suggestions, as described herein. For example, the software development kit module 908 may provide an application programming interface for initiating the identification of candidate emoticons.

Advantageously, the user-defined emoticon system 900 facilitates the creation and distribution of emoticons through crowd sourcing. As users create and submit new user-defined emoticons, a library of available emoticons increases in size and specificity. This enables the emoticon suggestion system 200 to provide users with a wide variety of emoticons that more easily satisfy personal preferences of users and are more suitable for use in specific circumstances. For example, when a user enters the text "red house," the user may wish to insert an emoticon of a red house, rather than an emoticon of a house having a different color.

The creation and distribution of emoticons through crowd sourcing also allows user-defined emoticons and other emoticons to be tested by users, thereby identifying emoticons that are more popular or of higher quality and therefore more likely to be used. In certain instances, emoticons that are popular are more likely to be suggested to the user for insertion into a text message. For example, as a user is entering a text message, the systems and methods described herein may suggest emoticons to the user that have proven to be popular by other users.

The systems and methods may track the popularity of emoticons according specific words and languages. For example, when a user enters a particular word in a message, the user-defined emoticon system 900 may identify the emoticons that are popular for that particular word and then suggest those emoticons to the user. For the same word translated to a different language, the popular emoticons may be different. The set of popular emoticons suggested to the user may therefore depend on the particular language being used by the user and/or a recipient of the message.

In one embodiment, a user has a personalized bank of preferred emoticons that may be suggested more often to the user than other emoticons, e.g., developed through crowd sourcing. The personalized bank of preferred emoticons may include emoticons that have been used in one or more prior instances by the user. The personalized bank of preferred emoticons may be generated and/or augmented automatically, each time the user selects an emoticon for insertion into a message. In some implementations, users may manually select emoticons for inclusion into their personalized bank of preferred emoticons.

In certain implementations, the systems and methods facilitate the creation, submission, and use of emoticons associated with companies, brands, products, and/or services. For example, a company may create and submit emoticons that use or include the company's trademarks, service marks, and/or logos. When a user enters the name of the company or the company's products or services into a message, the emoticon suggestion system 200 may automatically suggest one or more of the company's emoticons to the user for insertion into the message. For example, when a user enters a message that includes the word "iPhone," the emoticon suggestion system 200 may suggest emoticons to the user that show an image of an IPHONE or a logo or trademark for Apple Inc., the manufacturer of the IPHONE. When the user selects a company emoticon for insertion in the message, the emoticon credit module 904 may credit the user's account. Alternatively or additionally, insertion and/or submission of a company emoticon may cause the emoticon credit module 904 to transfer funds from the company to the owners or operators of the emoticon suggestion system 200. In such instances, the funds may represent an advertising fee for presenting the company emoticon in the message. In certain instances, insertion of a company's emoticons may occur automatically, for example, whenever a user creates a message that includes a reference to the company's name, products, services, trademarks, or service marks.

Companies that use or otherwise interact with the systems and methods described herein may have at least partial control over the emoticons that are available for insertion by users. For example, when a user enters the name of a company into a message, the emoticon suggestion system 200 may present to the user only emoticons that have been approved by the company. In some instances, the user may be able to insert only an approved company logo or trademark next to the name of the company, or next to the names of the company's products and services. In general, the emoticons inserted and submitted into user messages may be small (e.g., the approximate size of text in a message) or large (e.g., occupying several lines of text or more), and may be animated or non-animated.

Various embodiments are described herein as examples. It will be apparent to those skilled in the art that various modifications may be made and other embodiments can be used without departing from the broader scope of the present invention(s). Therefore, these and other variations upon the exemplary embodiments are intended to be covered by the present invention(s).

What is claimed is:

1. A computer-implemented method comprising:
receiving first text submitted by a first user;
for each of a plurality of different previously submitted texts, calculating a text similarity score based on a textual similarity of the first text to the previously submitted text, and calculating a sentiment similarity score based on a similarity between sentiment of the first text and sentiment of the previously submitted text;
based on the scores, selecting one or more of the previously submitted texts having closest similarity to the first text;
for each of the selected texts, identifying an emoticon previously selected by a user for insertion into the selected text; and
providing the identified emoticons for selection by the first user.

2. The method of claim 1, further comprising:
receiving selection by the first user of one of the identified emoticons; and
inserting the selected emoticon into the first text.

3. The method of claim 2, wherein the selected emoticon is inserted at a current position of an input cursor in the first text.

4. The method of claim 1 wherein selecting one or more of the previously submitted texts having closest similarity to the first text comprises:
generating a combined score for each of the previously submitted texts based on a combination of similarity scores calculated for the previously submitted text; and
selecting one or more of the previously submitted texts based on the combined scores.

5. The method of claim 4 wherein the combination of similarity scores is a weighted combination.

6. The method of claim 1 wherein calculating the text similarity score between a particular previously submitted text and the first text comprises calculating an edit distance between the particular text and the first text.

7. The method of claim 1 wherein calculating the text similarity score between a particular previously submitted text and the first text comprises determining if a plurality of words in the particular text occur in the first text in the same order that they occur in the particular text.

8. The method of claim 1, further comprising:
calculating a language similarity score based on a similarity between a language of the first text and a language of a second text.

9. The method of claim 1 wherein a particular identified emoticon is a user-defined emoticon comprising a visual representation and being associated with a respective sentiment.

10. A system comprising:
one or more computers programmed to perform operations comprising:
receiving first text submitted by a first user;
for each of a plurality of different previously submitted texts, calculating a text similarity score based on a textual similarity of the first text to the previously submitted text, and calculating a sentiment similarity score based on a similarity between sentiment of the first text and sentiment of the previously submitted text;
based on the scores, selecting one or more of the previously submitted texts having closest similarity to the first text;
for each of the selected texts, identifying an emoticon previously selected by a user for insertion into the selected text; and
providing the identified emoticons for selection by the first user.

11. The system of claim 10 wherein the operations further comprise:
receiving selection by the first user of one of the identified emoticons; and
inserting the selected emoticon into the first text.

12. The system of claim 11, wherein the selected emoticon is inserted at a current position of an input cursor in the first text.

13. The system of claim 10 wherein selecting one or more of the previously submitted texts having closest similarity to the first text comprises:
generating a combined score for each of the previously submitted texts based on a combination of similarity scores calculated for the previously submitted text; and
selecting one or more of the previously submitted texts based on the combined scores.

14. The system of claim 13 wherein the combination of similarity scores is a weighted combination.

15. The system of claim 10 wherein calculating the text similarity score between a particular previously submitted text and the first text comprises calculating an edit distance between the particular text and the first text.

16. The system of claim 10 wherein calculating the text similarity score between a particular previously submitted text and the first text comprises determining if a plurality of words in the particular text occur in the first text in the same order that they occur in the particular text.

17. The system of claim 10 wherein the operations further comprise:
calculating a language similarity score based on a similarity between a language of the first text and a language of a second text.

18. The system of claim 10 wherein a particular identified emoticon is a user-defined emoticon comprising a visual representation and being associated with a respective sentiment.

19. An article comprising a non-transitory machine-readable medium having instructions stored thereon that when executed by a computer causes the computer to perform operations comprising:
receiving first text submitted by a first user;
for each of a plurality of different previously submitted texts, calculating a text similarity score based on a textual similarity of the first text to the previously submitted text, and calculating a sentiment similarity score based on a similarity between sentiment of the first text and sentiment of the previously submitted text;
based on the scores, selecting one or more of the previously submitted texts having closest similarity to the first text;
for each of the selected texts, identifying an emoticon previously selected by a user for insertion into the selected text; and
providing the identified emoticons for selection by the first user.

20. The article of claim 19 wherein the operations further comprise:
receiving selection by the first user of one of the identified emoticons; and
inserting the selected emoticon into the first text.

21. The article of claim 20, wherein the selected emoticon is inserted at a current position of an input cursor in the first text.

22. The article of claim 19 wherein selecting one or more of the previously submitted texts having closest similarity to the first text comprises:
generating a combined score for each of the previously submitted texts based on a combination of similarity scores calculated for the previously submitted text; and
selecting one or more of the previously submitted texts based on the combined scores.

23. The article of claim 22 wherein the combination of similarity scores is a weighted combination.

24. The article of claim 19 wherein calculating the text similarity score between a particular previously submitted text and the first text comprises calculating an edit distance between the particular text and the first text.

25. The article of claim 19 wherein calculating the text similarity score between a particular previously submitted text and the first text comprises determining if a plurality of words in the particular text occur in the first text in the same order that they occur in the particular text.

26. The article of claim 19 wherein the operations further comprise:
calculating a language similarity score based on a similarity between a language of the first text and a language of a second text.

* * * * *